US008487879B2

(12) United States Patent
Kim et al.

(10) Patent No.: US 8,487,879 B2
(45) Date of Patent: Jul. 16, 2013

(54) SYSTEMS AND METHODS FOR INTERACTING WITH A COMPUTER THROUGH HANDWRITING TO A SCREEN

(75) Inventors: Jane T Kim, Seattle, WA (US); Peter D. Sommer, Carnation, WA (US); Simin Wang, Redmond, WA (US); Natalie M Eason, Bothell, WA (US); Shiraz J. Cupala, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 907 days.

(21) Appl. No.: 10/976,451

(22) Filed: Oct. 29, 2004

(65) Prior Publication Data

US 2006/0092138 A1    May 4, 2006

(51) Int. Cl.
*G06F 3/041* (2006.01)

(52) U.S. Cl.
USPC ........... 345/173; 345/619; 345/650; 345/654; 345/681; 345/467

(58) Field of Classification Search
None
See application file for complete search history.

(56) References Cited

U.S. PATENT DOCUMENTS

| | | | |
|---|---|---|---|
| 4,514,800 A | 4/1985 | Gruner et al. |
| 4,641,274 A | 2/1987 | Swank |
| 4,674,040 A | 6/1987 | Barker et al. |
| 4,723,211 A | 2/1988 | Barker et al. |
| 4,739,477 A | 4/1988 | Barker et al. |
| 4,783,648 A | 11/1988 | Homma et al. |
| 4,815,029 A | 3/1989 | Barker et al. |
| 4,847,749 A | 7/1989 | Collins et al. |
| 4,910,663 A | 3/1990 | Bailey |
| 4,926,476 A | 5/1990 | Covey |
| 4,933,880 A | 6/1990 | Borgendale et al. |
| 4,962,475 A | 10/1990 | Hernandez et al. |
| 4,975,690 A | 12/1990 | Torres |
| 5,072,412 A | 12/1991 | Henderson, Jr. et al. |
| 5,140,563 A | 8/1992 | Thinesen |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |

(Continued)

FOREIGN PATENT DOCUMENTS

| | | |
|---|---|---|
| AU | 2006200285 | 1/2011 |
| EP | 0841615 | 5/1998 |

(Continued)

OTHER PUBLICATIONS

"Architecture for a Dynamic Information Area Control" IBM Technical Disclosure Bulletin IBM Corp. New York US vol. 37 No. 10 Jan. 10, 1994. pp. 245-246.

(Continued)

*Primary Examiner* — Sumati Lefkowitz
*Assistant Examiner* — Jesus Hernandez
(74) *Attorney, Agent, or Firm* — Wolfe-SBMC

(57) ABSTRACT

Systems and methods are described that enable a user to: select a control with a handwritten stroke at least part of which resides outside of a selectable area of the control; use a moving-input control without having to make a selection other than handwriting on, over, or near the control; and/or delete text displayed on an electronic form by handwriting over that text.

20 Claims, 10 Drawing Sheets

U.S. PATENT DOCUMENTS

| | | | |
|---|---|---|---|
| 5,206,951 A | 4/1993 | Khoyi et al. | |
| 5,218,672 A | 6/1993 | Morgan et al. | |
| 5,220,649 A * | 6/1993 | Forcier | 715/273 |
| 5,237,680 A | 8/1993 | Adams et al. | |
| 5,249,275 A | 9/1993 | Srivastava | |
| 5,274,803 A | 12/1993 | Dubin et al. | |
| 5,287,448 A | 2/1994 | Nicol et al. | |
| 5,297,249 A | 3/1994 | Bernstein et al. | |
| 5,297,283 A | 3/1994 | Kelly, Jr. et al. | |
| 5,313,631 A | 5/1994 | Kao | |
| 5,313,646 A | 5/1994 | Hendricks et al. | |
| 5,317,686 A | 5/1994 | Salas et al. | |
| 5,325,481 A | 6/1994 | Hunt | |
| 5,333,317 A | 7/1994 | Dann | |
| 5,339,423 A | 8/1994 | Beitel et al. | |
| 5,339,424 A | 8/1994 | Fushimi | |
| 5,341,478 A | 8/1994 | Travis, Jr. et al. | |
| 5,369,766 A | 11/1994 | Nakano et al. | |
| 5,369,778 A | 11/1994 | San Soucie et al. | |
| 5,371,675 A | 12/1994 | Greif et al. | |
| 5,377,323 A | 12/1994 | Vasudevan | |
| 5,381,547 A | 1/1995 | Flug et al. | |
| 5,390,325 A | 2/1995 | Miller | |
| 5,396,623 A | 3/1995 | McCall et al. | |
| 5,408,665 A | 4/1995 | Fitzgerald | |
| 5,410,688 A | 4/1995 | Williams et al. | |
| 5,412,772 A | 5/1995 | Monson | |
| 5,428,738 A | 6/1995 | Carter et al. | |
| 5,434,965 A | 7/1995 | Matheny et al. | |
| 5,434,975 A | 7/1995 | Allen | |
| 5,436,637 A | 7/1995 | Gayraud et al. | |
| 5,440,744 A | 8/1995 | Jacobson et al. | |
| 5,446,842 A | 8/1995 | Schaeffer et al. | |
| 5,459,865 A | 10/1995 | Heninger et al. | |
| 5,463,726 A | 10/1995 | Price | |
| 5,481,722 A | 1/1996 | Skinner | |
| 5,504,898 A | 4/1996 | Klein | |
| 5,511,116 A | 4/1996 | Shastry et al. | |
| 5,517,655 A | 5/1996 | Collins et al. | |
| 5,535,389 A | 7/1996 | Elder et al. | |
| 5,537,596 A | 7/1996 | Yu et al. | |
| 5,540,558 A | 7/1996 | Harden et al. | |
| 5,542,070 A | 7/1996 | LeBlanc et al. | |
| 5,548,745 A | 8/1996 | Egan et al. | |
| 5,550,976 A | 8/1996 | Henderson et al. | |
| 5,551,035 A | 8/1996 | Arnold et al. | |
| 5,566,330 A | 10/1996 | Sheffield | |
| 5,572,643 A | 11/1996 | Judson | |
| 5,572,648 A | 11/1996 | Bibayan | |
| 5,577,252 A | 11/1996 | Nelson et al. | |
| 5,581,686 A | 12/1996 | Koppolu et al. | |
| 5,581,760 A | 12/1996 | Atkinson et al. | |
| 5,600,789 A | 2/1997 | Parker et al. | |
| 5,602,996 A | 2/1997 | Powers, III et al. | |
| 5,608,720 A | 3/1997 | Biegel et al. | |
| 5,627,979 A | 5/1997 | Chang et al. | |
| 5,630,126 A | 5/1997 | Redpath | |
| 5,634,113 A | 5/1997 | Rusterholz | |
| 5,634,121 A | 5/1997 | Tracz et al. | |
| 5,634,124 A | 5/1997 | Khoyi et al. | |
| 5,640,544 A | 6/1997 | Onodera et al. | |
| 5,644,739 A | 7/1997 | Moursund | |
| 5,659,729 A | 8/1997 | Nielsen | |
| 5,664,178 A | 9/1997 | Sinofsky | |
| 5,669,005 A | 9/1997 | Curbow et al. | |
| 5,682,536 A | 10/1997 | Atkinson et al. | |
| 5,689,703 A | 11/1997 | Atkinson et al. | |
| 5,706,501 A | 1/1998 | Horikiri et al. | |
| 5,717,939 A | 2/1998 | Bricklin et al. | |
| 5,720,016 A | 2/1998 | Egashira | |
| 5,721,824 A | 2/1998 | Taylor | |
| 5,734,380 A | 3/1998 | Adams et al. | |
| 5,740,439 A | 4/1998 | Atkinson et al. | |
| 5,740,455 A | 4/1998 | Pavley et al. | |
| 5,742,504 A | 4/1998 | Meyer et al. | |
| 5,742,795 A | 4/1998 | Kussel | |
| 5,745,683 A | 4/1998 | Lee et al. | |
| 5,758,184 A | 5/1998 | Lucovsky et al. | |
| 5,758,358 A | 5/1998 | Ebbo | |
| 5,761,408 A | 6/1998 | Kolawa et al. | |
| 5,761,683 A | 6/1998 | Logan et al. | |
| 5,764,984 A | 6/1998 | Loucks | |
| 5,764,985 A | 6/1998 | Smale | |
| 5,778,372 A | 7/1998 | Cordell et al. | |
| 5,784,555 A | 7/1998 | Stone | |
| 5,796,403 A | 8/1998 | Adams et al. | |
| 5,798,757 A | 8/1998 | Smith | |
| 5,801,701 A | 9/1998 | Koppolu et al. | |
| 5,801,702 A | 9/1998 | Dolan et al. | |
| 5,802,304 A | 9/1998 | Stone | |
| 5,802,530 A | 9/1998 | Van Hoff | |
| 5,805,824 A | 9/1998 | Kappe | |
| 5,806,079 A | 9/1998 | Rivette et al. | |
| 5,815,830 A | 9/1998 | Anthony | |
| 5,825,359 A | 10/1998 | Derby et al. | |
| 5,826,031 A | 10/1998 | Nielsen | |
| 5,826,265 A | 10/1998 | Van Huben et al. | |
| 5,835,777 A | 11/1998 | Staelin | |
| 5,838,906 A | 11/1998 | Doyle et al. | |
| 5,842,018 A | 11/1998 | Atkinson et al. | |
| 5,845,077 A | 12/1998 | Fawcett | |
| 5,845,090 A | 12/1998 | Collins, III et al. | |
| 5,845,122 A | 12/1998 | Nielsen et al. | |
| 5,854,630 A | 12/1998 | Nielsen | |
| 5,859,973 A | 1/1999 | Carpenter et al. | |
| 5,862,372 A | 1/1999 | Morris et al. | |
| 5,862,379 A | 1/1999 | Rubin et al. | |
| 5,864,819 A | 1/1999 | De Armas et al. | |
| 5,873,088 A | 2/1999 | Hayashi et al. | |
| 5,898,434 A | 4/1999 | Small et al. | |
| 5,905,492 A | 5/1999 | Straub et al. | |
| 5,907,621 A | 5/1999 | Bachman et al. | |
| 5,907,704 A | 5/1999 | Gudmundson et al. | |
| 5,911,776 A | 6/1999 | Guck | |
| 5,915,112 A | 6/1999 | Boutcher | |
| 5,919,247 A | 7/1999 | Van Hoff et al. | |
| 5,922,072 A | 7/1999 | Hutchinson et al. | |
| 5,928,363 A | 7/1999 | Ruvolo | |
| 5,929,858 A | 7/1999 | Shibata et al. | |
| 5,940,075 A | 8/1999 | Mutschler, III et al. | |
| 5,950,010 A | 9/1999 | Hesse et al. | |
| 5,953,731 A | 9/1999 | Glaser | |
| 5,956,481 A | 9/1999 | Walsh et al. | |
| 5,960,199 A | 9/1999 | Brodsky et al. | |
| 5,963,208 A | 10/1999 | Dolan et al. | |
| 5,963,964 A | 10/1999 | Nielsen | |
| 5,973,696 A | 10/1999 | Agranat et al. | |
| 5,982,370 A | 11/1999 | Kamper | |
| 5,983,348 A | 11/1999 | Ji | |
| 5,987,480 A | 11/1999 | Donohue et al. | |
| 5,991,710 A | 11/1999 | Papineni et al. | |
| 5,995,103 A | 11/1999 | Ashe | |
| 5,999,740 A | 12/1999 | Rowley | |
| 6,006,227 A | 12/1999 | Freeman et al. | |
| 6,012,066 A | 1/2000 | Discount et al. | |
| 6,014,135 A | 1/2000 | Fernandes | |
| 6,016,520 A | 1/2000 | Facq et al. | |
| 6,018,743 A | 1/2000 | Xu | |
| 6,026,379 A | 2/2000 | Haller et al. | |
| 6,026,416 A | 2/2000 | Kanerva et al. | |
| 6,031,989 A | 2/2000 | Cordell | |
| 6,035,297 A | 3/2000 | Van Huben et al. | |
| 6,035,309 A | 3/2000 | Dauerer et al. | |
| 6,044,205 A | 3/2000 | Reed et al. | |
| 6,052,710 A | 4/2000 | Saliba et al. | |
| 6,054,987 A | 4/2000 | Richardson | |
| 6,057,837 A | 5/2000 | Hatakeda et al. | |
| 6,058,413 A | 5/2000 | Flores et al. | |
| 6,069,626 A * | 5/2000 | Cline et al. | 715/786 |
| 6,070,184 A | 5/2000 | Blount et al. | |
| 6,072,870 A | 6/2000 | Nguyen et al. | |
| 6,078,326 A | 6/2000 | Kilmer et al. | |
| 6,078,327 A | 6/2000 | Liman et al. | |
| 6,081,610 A | 6/2000 | Dwork et al. | |
| 6,084,585 A | 7/2000 | Kraft et al. | |
| 6,088,679 A | 7/2000 | Barkley | |
| 6,088,708 A | 7/2000 | Burch et al. | |

| | | |
|---|---|---|
| 6,091,417 A | 7/2000 | Lefkowitz |
| 6,094,657 A | 7/2000 | Hailpern et al. |
| 6,098,081 A | 8/2000 | Heidorn et al. |
| 6,106,570 A | 8/2000 | Mizuhara |
| 6,108,637 A | 8/2000 | Blumenau |
| 6,108,783 A | 8/2000 | Krawczyk et al. |
| 6,115,044 A | 9/2000 | Alimpich et al. |
| 6,122,647 A | 9/2000 | Horowitz et al. |
| 6,144,969 A | 11/2000 | Inokuchi et al. |
| 6,151,624 A | 11/2000 | Teare et al. |
| 6,154,128 A | 11/2000 | Wookey et al. |
| 6,161,107 A | 12/2000 | Stern |
| 6,163,772 A | 12/2000 | Kramer et al. |
| 6,167,521 A | 12/2000 | Smith et al. |
| 6,178,551 B1 | 1/2001 | Sana et al. |
| 6,182,094 B1 | 1/2001 | Humpleman et al. |
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,423 B1 | 4/2001 | Davis |
| 6,219,698 B1 | 4/2001 | Iannucci et al. |
| 6,225,996 B1 | 5/2001 | Gibb et al. |
| 6,235,027 B1 | 5/2001 | Herzon |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,275,227 B1 | 8/2001 | DeStefano |
| 6,275,599 B1 | 8/2001 | Adler et al. |
| 6,279,042 B1 | 8/2001 | Ouchi |
| 6,281,896 B1 | 8/2001 | Alimpich et al. |
| 6,282,711 B1 | 8/2001 | Halpern et al. |
| 6,286,033 B1 | 9/2001 | Kishinsky et al. |
| 6,292,897 B1 | 9/2001 | Gennaro et al. |
| 6,297,819 B1 | 10/2001 | Furst |
| 6,308,179 B1 | 10/2001 | Petersen et al. |
| 6,311,221 B1 | 10/2001 | Raz et al. |
| 6,311,271 B1 | 10/2001 | Gennaro et al. |
| 6,314,415 B1 | 11/2001 | Mukherjee |
| 6,321,334 B1 | 11/2001 | Jerger et al. |
| 6,327,628 B1 | 12/2001 | Anuff et al. |
| 6,336,214 B1 | 1/2002 | Sundaresan |
| 6,342,907 B1 | 1/2002 | Petty et al. |
| 6,343,302 B1 | 1/2002 | Graham |
| 6,345,256 B1 | 2/2002 | Milsted et al. |
| 6,345,361 B1 | 2/2002 | Jerger et al. |
| 6,347,323 B1 | 2/2002 | Garber et al. |
| 6,349,408 B1 | 2/2002 | Smith |
| 6,353,851 B1 | 3/2002 | Anupam et al. |
| 6,353,926 B1 | 3/2002 | Parthesarathy et al. |
| 6,356,906 B1 | 3/2002 | Lippert et al. |
| 6,357,038 B1 | 3/2002 | Scouten |
| 6,366,912 B1 | 4/2002 | Wallent et al. |
| 6,369,840 B1 | 4/2002 | Barnett et al. |
| 6,369,841 B1 | 4/2002 | Salomon et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,385,767 B1 | 5/2002 | Ziebell |
| 6,389,434 B1 | 5/2002 | Rivette et al. |
| 6,393,442 B1 | 5/2002 | Cromarty et al. |
| 6,393,456 B1 | 5/2002 | Ambler et al. |
| 6,393,469 B1 | 5/2002 | Dozier et al. |
| 6,396,488 B1 | 5/2002 | Simmons et al. |
| 6,397,264 B1 | 5/2002 | Stasnick et al. |
| 6,401,077 B1 | 6/2002 | Godden et al. |
| 6,405,238 B1 | 6/2002 | Votipka |
| 6,408,311 B1 | 6/2002 | Baisley et al. |
| 6,421,070 B1 | 7/2002 | Ramos et al. |
| 6,421,656 B1 | 7/2002 | Cheng et al. |
| 6,425,125 B1 | 7/2002 | Fries et al. |
| 6,427,142 B1 | 7/2002 | Zachary et al. |
| 6,434,563 B1 | 8/2002 | Pasquali et al. |
| 6,434,564 B2 | 8/2002 | Ebert |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,460,058 B2 | 10/2002 | Koppolu et al. |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky et al. |
| 6,480,860 B1 | 11/2002 | Monday |
| 6,487,566 B1 | 11/2002 | Sundaresan |
| 6,493,007 B1 | 12/2002 | Pang |
| 6,493,702 B1 | 12/2002 | Adar et al. |
| 6,496,203 B1 | 12/2002 | Beaumont et al. |
| 6,502,101 B1 | 12/2002 | Verprauskus et al. |
| 6,502,103 B1 | 12/2002 | Frey et al. |
| 6,505,200 B1 | 1/2003 | Ims et al. |
| 6,505,230 B1 | 1/2003 | Mohan et al. |
| 6,505,300 B2 | 1/2003 | Chan et al. |
| 6,507,856 B1 | 1/2003 | Chen et al. |
| 6,513,154 B1 | 1/2003 | Porterfield |
| 6,516,322 B1 | 2/2003 | Meredith |
| 6,519,617 B1 | 2/2003 | Wanderski et al. |
| 6,523,027 B1 | 2/2003 | Underwood |
| 6,529,909 B1 | 3/2003 | Bowman-Amuah |
| 6,535,229 B1 | 3/2003 | Kraft |
| 6,535,883 B1 | 3/2003 | Lee et al. |
| RE38,070 E | 4/2003 | Spies et al. |
| 6,546,546 B1 | 4/2003 | Van Doorn |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,559,966 B1 | 5/2003 | Laverty et al. |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,574,655 B1 | 6/2003 | Libert et al. |
| 6,578,144 B1 | 6/2003 | Gennaro et al. |
| 6,580,440 B1 | 6/2003 | Wagner et al. |
| 6,581,061 B2 | 6/2003 | Graham |
| 6,584,548 B1 | 6/2003 | Bourne et al. |
| 6,585,778 B1 | 7/2003 | Hind et al. |
| 6,594,686 B1 | 7/2003 | Edwards et al. |
| 6,598,219 B1 | 7/2003 | Lau |
| 6,604,099 B1 | 8/2003 | Chung et al. |
| 6,604,238 B1 | 8/2003 | Lim et al. |
| 6,606,606 B2 | 8/2003 | Starr |
| 6,609,200 B2 | 8/2003 | Anderson et al. |
| 6,611,822 B1 | 8/2003 | Beams et al. |
| 6,611,840 B1 | 8/2003 | Baer et al. |
| 6,613,098 B1 | 9/2003 | Sorge et al. |
| 6,615,276 B1 | 9/2003 | Mastrianni et al. |
| 6,625,622 B1 | 9/2003 | Henrickson et al. |
| 6,629,109 B1 | 9/2003 | Koshisaka |
| 6,631,357 B1 | 10/2003 | Perkowski |
| 6,631,379 B2 | 10/2003 | Cox |
| 6,631,519 B1 | 10/2003 | Nicholson et al. |
| 6,635,089 B1 | 10/2003 | Burkett et al. |
| 6,636,242 B2 | 10/2003 | Bowman-Amuah |
| 6,636,845 B2 | 10/2003 | Chau et al. |
| 6,640,249 B1 | 10/2003 | Bowman-Amuah |
| 6,643,633 B2 | 11/2003 | Chau et al. |
| 6,643,684 B1 | 11/2003 | Malkin et al. |
| 6,654,737 B1 | 11/2003 | Nunez |
| 6,658,417 B1 | 12/2003 | Stakutis et al. |
| 6,661,920 B1 * | 12/2003 | Skinner .................. 382/187 |
| 6,668,369 B1 | 12/2003 | Krebs et al. |
| 6,678,625 B1 | 1/2004 | Reise et al. |
| 6,678,717 B1 | 1/2004 | Schneider |
| 6,681,370 B2 | 1/2004 | Gounares et al. |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,710,789 B1 | 3/2004 | Sekiguchi et al. |
| 6,711,679 B1 | 3/2004 | Guski et al. |
| 6,735,721 B1 | 5/2004 | Morrow et al. |
| 6,738,783 B2 | 5/2004 | Melli et al. |
| 6,745,367 B1 | 6/2004 | Bates et al. |
| 6,748,385 B1 | 6/2004 | Rodkin |

| | | |
|---|---|---|
| 6,748,569 B1 | 6/2004 | Brooke et al. |
| 6,751,777 B2 | 6/2004 | Bates et al. |
| 6,757,826 B1 | 6/2004 | Paltenghe |
| 6,757,890 B1 | 6/2004 | Wallman |
| 6,760,723 B2 | 7/2004 | Oshinsky et al. |
| 6,772,139 B1 | 8/2004 | Smith, III |
| 6,772,165 B2 | 8/2004 | O'Carroll |
| 6,774,926 B1 | 8/2004 | Ellis et al. |
| 6,774,928 B2 | 8/2004 | Bruzzone |
| 6,779,154 B1 | 8/2004 | Nussbaum et al. |
| 6,806,892 B1 | 10/2004 | Plow et al. |
| 6,816,849 B1 | 11/2004 | Halt, Jr. |
| 6,823,478 B1 | 11/2004 | Prologo et al. |
| 6,828,992 B1 | 12/2004 | Freeman et al. |
| 6,833,925 B1 | 12/2004 | Igoe et al. |
| 6,842,175 B1 | 1/2005 | Schmalstieg et al. |
| 6,845,380 B2 | 1/2005 | Su et al. |
| 6,845,499 B2 | 1/2005 | Srivastava et al. |
| 6,848,078 B1 | 1/2005 | Birsan et al. |
| 6,850,895 B2 | 2/2005 | Brodersen et al. |
| 6,862,689 B2 | 3/2005 | Bergsten et al. |
| 6,871,220 B1 | 3/2005 | Rajan et al. |
| 6,874,130 B1 | 3/2005 | Baweja et al. |
| 6,874,143 B1 | 3/2005 | Murray |
| 6,876,996 B2 | 4/2005 | Czajkowski et al. |
| 6,883,168 B1 | 4/2005 | James et al. |
| 6,889,359 B1 | 5/2005 | Conner et al. |
| 6,901,403 B1 | 5/2005 | Bata et al. |
| 6,931,532 B1 | 8/2005 | Davis et al. |
| 6,941,510 B1 | 9/2005 | Ozzie et al. |
| 6,948,129 B1 | 9/2005 | Loghmani |
| 6,948,133 B2 | 9/2005 | Haley |
| 6,950,987 B1 | 9/2005 | Hargraves et al. |
| 6,957,395 B1 | 10/2005 | Jobs et al. |
| 6,963,875 B2 | 11/2005 | Moore et al. |
| 6,968,505 B2 | 11/2005 | Stoll et al. |
| 6,993,722 B1 | 1/2006 | Greer et al. |
| 6,996,781 B1 | 2/2006 | Myers et al. |
| 7,000,179 B2 | 2/2006 | Yankovich et al. |
| 7,002,560 B2 * | 2/2006 | Graham ............... 345/179 |
| 7,003,548 B1 | 2/2006 | Barck et al. |
| 7,003,722 B2 | 2/2006 | Rothchiller et al. |
| 7,013,340 B1 | 3/2006 | Burd et al. |
| 7,020,869 B2 | 3/2006 | Abrari et al. |
| 7,043,687 B2 | 5/2006 | Knauss et al. |
| 7,043,688 B1 | 5/2006 | Tsutsumi et al. |
| 7,076,728 B2 | 7/2006 | Davis et al. |
| 7,081,882 B2 | 7/2006 | Sowden et al. |
| 7,107,522 B1 | 9/2006 | Morgan et al. |
| 7,107,539 B2 | 9/2006 | Abbott et al. |
| 7,120,863 B1 | 10/2006 | Wang |
| 7,130,885 B2 | 10/2006 | Chandra et al. |
| 7,134,083 B1 | 11/2006 | Guerrero |
| 7,143,341 B1 | 11/2006 | Kohli |
| 7,152,027 B2 | 12/2006 | Andrade et al. |
| 7,159,011 B1 | 1/2007 | Knight et al. |
| 7,178,166 B1 | 2/2007 | Taylor et al. |
| 7,200,665 B2 | 4/2007 | Eshghi et al. |
| 7,200,816 B2 | 4/2007 | Falk et al. |
| 7,228,541 B2 | 6/2007 | Gupton et al. |
| 7,234,105 B2 | 6/2007 | Bezrukov et al. |
| 7,237,114 B1 | 6/2007 | Rosenberg |
| 7,249,328 B1 | 7/2007 | Davis |
| 7,251,777 B1 | 7/2007 | Valtchev et al. |
| 7,269,664 B2 | 9/2007 | Hutsch et al. |
| 7,272,815 B1 | 9/2007 | Eldridge |
| 7,281,206 B2 | 10/2007 | Schnelle et al. |
| 7,281,245 B2 | 10/2007 | Reynar et al. |
| 7,284,208 B2 | 10/2007 | Matthews |
| 7,284,239 B1 | 10/2007 | Young et al. |
| 7,287,218 B1 | 10/2007 | Knotz et al. |
| 7,293,268 B2 | 11/2007 | Masuda et al. |
| 7,295,336 B2 | 11/2007 | Yoshida et al. |
| 7,305,613 B2 | 12/2007 | Oezgen |
| 7,337,391 B2 | 2/2008 | Clarke et al. |
| 7,337,392 B2 | 2/2008 | Lue |
| 7,346,840 B1 | 3/2008 | Ravishankar et al. |
| 7,346,848 B1 | 3/2008 | Ruthfield et al. |
| 7,370,066 B1 | 5/2008 | Sikchi et al. |
| 7,373,595 B2 | 5/2008 | Jones et al. |
| 7,376,673 B1 | 5/2008 | Chalecki et al. |
| 7,412,649 B2 | 8/2008 | Emek et al. |
| 7,424,671 B2 | 9/2008 | Elza et al. |
| 7,428,699 B1 | 9/2008 | Kane et al. |
| 7,441,200 B2 | 10/2008 | Savage |
| 7,490,109 B1 | 2/2009 | Sikchi et al. |
| 7,490,167 B2 | 2/2009 | Pena et al. |
| 7,496,632 B2 | 2/2009 | Chapman et al. |
| 7,496,837 B1 | 2/2009 | Larcheveque et al. |
| 7,516,145 B2 | 4/2009 | Sikchi et al. |
| 7,543,228 B2 | 6/2009 | Kelkar |
| 7,549,115 B2 | 6/2009 | Kotler |
| 7,562,215 B2 | 7/2009 | Cummins |
| 7,584,417 B2 | 9/2009 | Friend |
| 7,613,996 B2 | 11/2009 | Dallett et al. |
| 7,653,687 B2 | 1/2010 | Reisman |
| 7,669,116 B2 | 2/2010 | Lopata et al. |
| 7,673,227 B2 | 3/2010 | Kotler et al. |
| 7,673,228 B2 | 3/2010 | Kelkar et al. |
| 7,676,843 B1 | 3/2010 | Stott et al. |
| 7,689,929 B2 | 3/2010 | Ruthfield |
| 7,692,636 B2 | 4/2010 | Kim |
| 7,707,487 B2 | 4/2010 | Easter et al. |
| 7,712,022 B2 | 5/2010 | Smuga |
| 7,721,190 B2 | 5/2010 | Sikchi |
| 7,725,834 B2 | 5/2010 | Bell |
| 7,743,063 B2 | 6/2010 | James et al. |
| 7,755,786 B2 | 7/2010 | Foehr et al. |
| 7,774,620 B1 | 8/2010 | Stott et al. |
| 7,779,027 B2 | 8/2010 | James |
| 7,818,677 B2 | 10/2010 | Ruthfield |
| 7,904,801 B2 | 3/2011 | Catorcini et al. |
| 7,913,159 B2 | 3/2011 | Larcheveque |
| 7,925,621 B2 | 4/2011 | Sikchi |
| 7,934,098 B1 | 4/2011 | Hahn et al. |
| 7,937,651 B2 | 5/2011 | Kelkar |
| 7,971,139 B2 | 6/2011 | Stanciu |
| 7,979,856 B2 | 7/2011 | Murray |
| 8,001,459 B2 | 8/2011 | Rivers-Moore |
| 8,010,515 B2 | 8/2011 | Mirzad |
| 8,074,217 B2 | 12/2011 | James |
| 8,078,960 B2 | 12/2011 | Chalecki |
| 8,117,552 B2 | 2/2012 | Paoli |
| 8,200,975 B2 | 6/2012 | O'Connor |
| 8,429,522 B2 | 4/2013 | Stanciu et al. |
| 2001/0003828 A1 | 6/2001 | Peterson et al. |
| 2001/0013947 A1 | 8/2001 | Van Der Linden et al. |
| 2001/0016880 A1 | 8/2001 | Cai et al. |
| 2001/0022592 A1 | 9/2001 | Alimpich et al. |
| 2001/0024195 A1 | 9/2001 | Hayakawa |
| 2001/0027472 A1 | 10/2001 | Guan |
| 2001/0037345 A1 | 11/2001 | Kiernan et al. |
| 2001/0044850 A1 | 11/2001 | Raz et al. |
| 2001/0047372 A1 | 11/2001 | Gorelik et al. |
| 2001/0051928 A1 | 12/2001 | Brody |
| 2001/0052121 A1 | 12/2001 | Masuda et al. |
| 2001/0056411 A1 | 12/2001 | Lindskog et al. |
| 2001/0056429 A1 | 12/2001 | Moore et al. |
| 2001/0056460 A1 | 12/2001 | Sahota et al. |
| 2002/0010855 A1 | 1/2002 | Reshef et al. |
| 2002/0019941 A1 | 2/2002 | Chan et al. |
| 2002/0023111 A1 | 2/2002 | Arora et al. |
| 2002/0026441 A1 | 2/2002 | Kutay et al. |
| 2002/0026461 A1 | 2/2002 | Kutay et al. |
| 2002/0032768 A1 | 3/2002 | Voskuil |
| 2002/0035581 A1 | 3/2002 | Reynar et al. |
| 2002/0040469 A1 | 4/2002 | Pramberger |
| 2002/0052769 A1 | 5/2002 | Navani et al. |
| 2002/0053021 A1 | 5/2002 | Rice et al. |
| 2002/0054115 A1 | 5/2002 | Mack et al. |
| 2002/0054126 A1 | 5/2002 | Gamon |
| 2002/0057297 A1 | 5/2002 | Grimes et al. |
| 2002/0059566 A1 | 5/2002 | Delcambre et al. |
| 2002/0065847 A1 | 5/2002 | Furukawa et al. |
| 2002/0065950 A1 | 5/2002 | Katz et al. |
| 2002/0083145 A1 | 6/2002 | Perinpanathan |
| 2002/0083148 A1 | 6/2002 | Shaw et al. |
| 2002/0083318 A1 | 6/2002 | Larose |

| | | |
|---|---|---|
| 2002/0091738 A1 | 7/2002 | Rohrabaugh et al. |
| 2002/0099952 A1 | 7/2002 | Lambert et al. |
| 2002/0100027 A1 | 7/2002 | Binding et al. |
| 2002/0103711 A1 | 8/2002 | Karas et al. |
| 2002/0111699 A1 | 8/2002 | Melli et al. |
| 2002/0111932 A1 | 8/2002 | Roberge et al. |
| 2002/0112224 A1 | 8/2002 | Cox |
| 2002/0133484 A1 | 9/2002 | Chau et al. |
| 2002/0143815 A1 | 10/2002 | Sather |
| 2002/0152244 A1 | 10/2002 | Dean et al. |
| 2002/0156772 A1 | 10/2002 | Chau et al. |
| 2002/0156929 A1 | 10/2002 | Hekmatpour |
| 2002/0169789 A1 | 11/2002 | Kutay et al. |
| 2002/0174147 A1 | 11/2002 | Wang et al. |
| 2002/0178380 A1 | 11/2002 | Wolf et al. |
| 2002/0184188 A1 | 12/2002 | Mandyam et al. |
| 2002/0184219 A1 | 12/2002 | Preisig et al. |
| 2002/0184401 A1 | 12/2002 | Kadel, Jr. et al. |
| 2002/0184485 A1 | 12/2002 | Dray et al. |
| 2002/0188613 A1 | 12/2002 | Chakraborty et al. |
| 2002/0194388 A1 | 12/2002 | Boloker et al. |
| 2002/0196288 A1 | 12/2002 | Emrani |
| 2002/0198891 A1 | 12/2002 | Li et al. |
| 2002/0198935 A1 | 12/2002 | Crandall et al. |
| 2003/0007000 A1 | 1/2003 | Carlson et al. |
| 2003/0014397 A1 | 1/2003 | Chau et al. |
| 2003/0018668 A1 | 1/2003 | Britton et al. |
| 2003/0023674 A1 | 1/2003 | Hildebrand |
| 2003/0023953 A1 | 1/2003 | Lucassen et al. |
| 2003/0025693 A1 | 2/2003 | Haley |
| 2003/0025732 A1 | 2/2003 | Prichard |
| 2003/0028550 A1 | 2/2003 | Lee et al. |
| 2003/0037021 A1 | 2/2003 | Krothappalli et al. |
| 2003/0037303 A1 | 2/2003 | Bodlaender et al. |
| 2003/0038788 A1* | 2/2003 | Demartines et al. .......... 345/173 |
| 2003/0043986 A1 | 3/2003 | Creamer et al. |
| 2003/0046665 A1 | 3/2003 | Llin |
| 2003/0051243 A1 | 3/2003 | Lemmons et al. |
| 2003/0056198 A1 | 3/2003 | Al-Azzawe et al. |
| 2003/0058286 A1 | 3/2003 | Dando |
| 2003/0061386 A1 | 3/2003 | Brown et al. |
| 2003/0069881 A1 | 4/2003 | Huttunen |
| 2003/0085918 A1 | 5/2003 | Beaumont et al. |
| 2003/0101414 A1 | 5/2003 | Liu et al. |
| 2003/0103071 A1 | 6/2003 | Lusen |
| 2003/0110443 A1 | 6/2003 | Yankovich et al. |
| 2003/0120659 A1 | 6/2003 | Sridhar |
| 2003/0120671 A1 | 6/2003 | Kim et al. |
| 2003/0120686 A1 | 6/2003 | Kim et al. |
| 2003/0140132 A1 | 7/2003 | Champagne et al. |
| 2003/0140160 A1 | 7/2003 | Raz et al. |
| 2003/0142072 A1 | 7/2003 | Lapstun et al. |
| 2003/0149934 A1 | 8/2003 | Worden |
| 2003/0158897 A1 | 8/2003 | Ben-Natan et al. |
| 2003/0167277 A1 | 9/2003 | Hejlsberg et al. |
| 2003/0172113 A1 | 9/2003 | Cameron et al. |
| 2003/0182268 A1 | 9/2003 | Lai |
| 2003/0187930 A1 | 10/2003 | Ghaffar et al. |
| 2003/0189593 A1 | 10/2003 | Yarvin |
| 2003/0200254 A1 | 10/2003 | Wei |
| 2003/0204481 A1 | 10/2003 | Lau |
| 2003/0204511 A1 | 10/2003 | Brundage |
| 2003/0204814 A1 | 10/2003 | Elo et al. |
| 2003/0205615 A1 | 11/2003 | Marappan |
| 2003/0206170 A1 | 11/2003 | Bickmore |
| 2003/0210428 A1 | 11/2003 | Bevlin et al. |
| 2003/0212902 A1 | 11/2003 | van der Made |
| 2003/0218620 A1 | 11/2003 | Lai et al. |
| 2003/0225768 A1 | 12/2003 | Chaudhuri et al. |
| 2003/0225829 A1 | 12/2003 | Pena et al. |
| 2003/0226111 A1 | 12/2003 | Wirts et al. |
| 2003/0226132 A1 | 12/2003 | Tondreau et al. |
| 2003/0236903 A1 | 12/2003 | Piotrowski |
| 2003/0237046 A1 | 12/2003 | Parker et al. |
| 2003/0237047 A1 | 12/2003 | Borson |
| 2004/0002939 A1 | 1/2004 | Arora |
| 2004/0002950 A1 | 1/2004 | Brennan et al. |
| 2004/0003341 A1 | 1/2004 | alSafadi et al. |
| 2004/0006744 A1 | 1/2004 | Jones et al. |
| 2004/0015778 A1 | 1/2004 | Britton et al. |
| 2004/0015783 A1 | 1/2004 | Lennon et al. |
| 2004/0032611 A1 | 2/2004 | Daly et al. |
| 2004/0046787 A1 | 3/2004 | Henry et al. |
| 2004/0046789 A1 | 3/2004 | Inanoria |
| 2004/0047643 A1 | 3/2004 | Jackelen et al. |
| 2004/0060006 A1 | 3/2004 | Lindblad et al. |
| 2004/0073565 A1 | 4/2004 | Kaufman et al. |
| 2004/0083431 A1 | 4/2004 | Graham et al. |
| 2004/0088320 A1 | 5/2004 | Perry |
| 2004/0088652 A1 | 5/2004 | Abe et al. |
| 2004/0111418 A1 | 6/2004 | Nguyen et al. |
| 2004/0117769 A1 | 6/2004 | Lauzon et al. |
| 2004/0128296 A1 | 7/2004 | Krishnamurthy et al. |
| 2004/0139400 A1 | 7/2004 | Allam et al. |
| 2004/0146199 A1 | 7/2004 | Berkner et al. |
| 2004/0148178 A1 | 7/2004 | Brain |
| 2004/0148514 A1 | 7/2004 | Fee et al. |
| 2004/0148571 A1 | 7/2004 | Lue |
| 2004/0162741 A1 | 8/2004 | Flaxer et al. |
| 2004/0163041 A1 | 8/2004 | Engel |
| 2004/0163046 A1 | 8/2004 | Chu et al. |
| 2004/0181543 A1 | 9/2004 | Wu et al. |
| 2004/0181711 A1 | 9/2004 | Johnson et al. |
| 2004/0186762 A1 | 9/2004 | Beaven et al. |
| 2004/0189708 A1 | 9/2004 | Larcheveque et al. |
| 2004/0193465 A1 | 9/2004 | Sangroniz et al. |
| 2004/0196266 A1* | 10/2004 | Matsuura et al. .............. 345/169 |
| 2004/0199572 A1 | 10/2004 | Hunt et al. |
| 2004/0205473 A1 | 10/2004 | Fisher et al. |
| 2004/0205571 A1 | 10/2004 | Adler et al. |
| 2004/0205592 A1 | 10/2004 | Huang |
| 2004/0205605 A1 | 10/2004 | Adler et al. |
| 2004/0205644 A1 | 10/2004 | Shaughnessy et al. |
| 2004/0210645 A1 | 10/2004 | Kouznetsov et al. |
| 2004/0215665 A1 | 10/2004 | Edgar et al. |
| 2004/0216084 A1 | 10/2004 | Brown et al. |
| 2004/0220912 A1 | 11/2004 | Manikutty et al. |
| 2004/0221245 A1 | 11/2004 | Chickles et al. |
| 2004/0260593 A1 | 12/2004 | Abraham-Fuchs et al. |
| 2004/0261032 A1 | 12/2004 | Olander et al. |
| 2004/0268259 A1 | 12/2004 | Rockey et al. |
| 2005/0027757 A1 | 2/2005 | Kiessig et al. |
| 2005/0028073 A1 | 2/2005 | Henry et al. |
| 2005/0033626 A1 | 2/2005 | Kruse et al. |
| 2005/0050066 A1 | 3/2005 | Hughes |
| 2005/0060647 A1 | 3/2005 | Doan et al. |
| 2005/0060721 A1 | 3/2005 | Choudhary et al. |
| 2005/0076022 A1 | 4/2005 | Wu et al. |
| 2005/0080801 A1 | 4/2005 | Kothandaraman et al. |
| 2005/0097536 A1 | 5/2005 | Bernstein et al. |
| 2005/0102370 A1 | 5/2005 | Lin et al. |
| 2005/0114764 A1 | 5/2005 | Gudenkauf et al. |
| 2005/0132043 A1 | 6/2005 | Wang et al. |
| 2005/0132196 A1 | 6/2005 | Dietl |
| 2005/0138031 A1 | 6/2005 | Wefers |
| 2005/0138539 A1 | 6/2005 | Bravery et al. |
| 2005/0149375 A1 | 7/2005 | Wefers |
| 2005/0159136 A1 | 7/2005 | Rouse et al. |
| 2005/0160398 A1 | 7/2005 | Bjornson et al. |
| 2005/0171746 A1 | 8/2005 | Thalhammer-Reyero |
| 2005/0183006 A1 | 8/2005 | Rivers-Moore et al. |
| 2005/0198086 A1 | 9/2005 | Moore et al. |
| 2005/0210263 A1 | 9/2005 | Levas et al. |
| 2005/0223320 A1 | 10/2005 | Brintzenhofe et al. |
| 2005/0234890 A1 | 10/2005 | Enzler et al. |
| 2005/0240620 A1 | 10/2005 | Danner et al. |
| 2005/0246304 A1 | 11/2005 | Knight et al. |
| 2005/0256933 A1 | 11/2005 | Millington et al. |
| 2005/0257148 A1 | 11/2005 | Goodman et al. |
| 2005/0262112 A1 | 11/2005 | Moore |
| 2005/0268217 A1 | 12/2005 | Garrison |
| 2006/0004910 A1 | 1/2006 | Burd et al. |
| 2006/0010386 A1 | 1/2006 | Khan |
| 2006/0020586 A1 | 1/2006 | Prompt et al. |
| 2006/0020883 A1 | 1/2006 | Kothari et al. |
| 2006/0026500 A1 | 2/2006 | Qa'Im-maqami |
| 2006/0031757 A9 | 2/2006 | Vincent |
| 2006/0036995 A1 | 2/2006 | Chickles et al. |

| | | | |
|---|---|---|---|
| 2006/0041593 A1 | 2/2006 | Borthakur et al. |
| 2006/0041838 A1 | 2/2006 | Khan |
| 2006/0059107 A1 | 3/2006 | Elmore et al. |
| 2006/0074981 A1 | 4/2006 | Mauceri |
| 2006/0075245 A1 | 4/2006 | Meier |
| 2006/0080657 A1 | 4/2006 | Goodman |
| 2006/0085409 A1 | 4/2006 | Rys et al. |
| 2006/0092138 A1 | 5/2006 | Kim et al. |
| 2006/0101051 A1 | 5/2006 | Carr et al. |
| 2006/0107206 A1 | 5/2006 | Koskimies |
| 2006/0107224 A1 | 5/2006 | Friend et al. |
| 2006/0129583 A1 | 6/2006 | Catorcini et al. |
| 2006/0129978 A1 | 6/2006 | Abrari et al. |
| 2006/0136422 A1 | 6/2006 | Matveief et al. |
| 2006/0155857 A1 | 7/2006 | Feenan et al. |
| 2006/0161837 A1 | 7/2006 | Kelkar et al. |
| 2006/0173865 A1 | 8/2006 | Fong |
| 2006/0184393 A1 | 8/2006 | Ewin et al. |
| 2006/0195413 A1 | 8/2006 | Davis et al. |
| 2006/0200754 A1 | 9/2006 | Kablesh et al. |
| 2006/0230363 A1 | 10/2006 | Rapp |
| 2006/0248468 A1 | 11/2006 | Constantine et al. |
| 2006/0271839 A1 | 11/2006 | Gottlieb et al. |
| 2006/0288329 A1 | 12/2006 | Gandhi |
| 2007/0005611 A1 | 1/2007 | Takasugi et al. |
| 2007/0005978 A1 | 1/2007 | O'Connor |
| 2007/0088554 A1 | 4/2007 | Harb et al. |
| 2007/0100967 A1 | 5/2007 | Smith et al. |
| 2007/0118538 A1 | 5/2007 | Ahern et al. |
| 2007/0130500 A1 | 6/2007 | Rivers-Moore et al. |
| 2007/0186157 A1 | 8/2007 | Walker et al. |
| 2008/0021916 A1 | 1/2008 | Schnelle et al. |
| 2008/0027896 A1 | 1/2008 | Anjur |
| 2008/0028340 A1 | 1/2008 | Davis |
| 2008/0040635 A1 | 2/2008 | Larcheveque et al. |
| 2008/0052287 A1 | 2/2008 | Stanciu |
| 2008/0126402 A1 | 5/2008 | Sikchi et al. |
| 2008/0134162 A1 | 6/2008 | James et al. |
| 2008/0162498 A1 | 7/2008 | Omoigui |
| 2008/0189335 A1 | 8/2008 | Sikchi et al. |
| 2009/0043798 A1 | 2/2009 | Tan et al. |
| 2009/0070411 A1 | 3/2009 | Chang et al. |
| 2009/0119580 A1 | 5/2009 | Rohrabaugh et al. |
| 2009/0138389 A1 | 5/2009 | Barthel |
| 2009/0177961 A1 | 7/2009 | Fortini |
| 2010/0125778 A1 | 5/2010 | Kelkar |
| 2011/0173560 A1 | 7/2011 | Larcheveque |
| 2011/0239101 A1 | 9/2011 | Rivers-Moore |
| 2011/0246868 A1 | 10/2011 | Stanciu |

FOREIGN PATENT DOCUMENTS

| | | |
|---|---|---|
| EP | 0841615 | 11/1999 |
| EP | 0961197 | 12/1999 |
| EP | 1076290 | 2/2001 |
| EP | 2325745 | 5/2011 |
| JP | 63085960 | 4/1988 |
| JP | 401173140 | 7/1989 |
| JP | 3191429 | 8/1991 |
| JP | 4225466 | 8/1992 |
| JP | 04290126 | 10/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 09016801 | 1/1997 |
| JP | 09146736 | 6/1997 |
| JP | 10171662 | 6/1998 |
| JP | 10207805 | 8/1998 |
| JP | 2000029713 | 1/2000 |
| JP | 2000132436 | 5/2000 |
| JP | 2002183652 | 6/2002 |
| JP | 2003173288 | 6/2003 |
| JP | 200329635 | 10/2003 |
| JP | 2003316769 | 11/2003 |
| JP | 2003337648 | 11/2003 |
| JP | 2004054749 | 2/2004 |
| JP | 2004341675 | 12/2004 |
| JP | 4833490 | 9/2011 |
| TW | 200506661 | 2/2004 |
| TW | I224742 | 12/2004 |
| WO | WO 99/24945 | 5/1999 |
| WO | WO-9924945 | 5/1999 |
| WO | WO 99/56207 | 11/1999 |
| WO | WO-9956207 | 11/1999 |
| WO | WO 01/44934 | 6/2001 |
| WO | WO-0144934 | 6/2001 |
| WO | WO-0198888 | 12/2001 |

OTHER PUBLICATIONS

Alschuler Liora "A tour of Xmetal" O'Reilly XML.COM 'Online Jul. 14, 1999 XP002230081 retrieved from the internet: <URL:http://www.xml.com/pub/a/SeyboldReport/ip0311025.html> retrieved on Feb. 5, 2003.

Au Irene et al. "Netscape Communicator's Collapsible Toolbars" CHI'98 Human Factors in Computing Systems Conference Proceedings Los Angeles CA Apr. 18-23, 1998 pp. 81-86.

Battle Steven A. et al.; "Flexible Information Presentation with XML" 1998 The Institution of Electrical Engineers 6 pages.

Brogden William; "Arbortext Adept 8 Editor Review" O'Reilly XML.COM 'Online! Sep. 22, 1999 XP002230080 retrieved from the Internet <URL:http://www.xml.com/pub/a/1999/09/adept/AdeptRvw.htm> retrieved on Feb. 5, 2003.

Chen Yi et al.: A; "XKvalidator: A Constraint Validator for XML" CIKM '-2 Nov. 4-9, 2002 Copyright 2002 ACM 1-58113-492-4/02/0011 pp. 446-452.

Ciancarini Paolo et al.; "Managing Complex Documents Over the WWW: A Case Study for XML" IEEE Transactions on Knowledge and Data Engineering Vo.l. 11 No. 4 Jul./Aug. 1999. pp. 629-938.

Davidow Ari: Alle; "XML Editors: Allegations of Functionality in search of reality" Internet 'Online! 1999 XP002230082 retrieved from the Internet <URL:http://www.ivritype.com/xml/>.

Kanemoto Hirotaka et al; "An Efficiently Updatable Index Scheme for Structured Documents" 1998 IEEE pp. 991-996.

Sutanthavibul Supoj et al.; "XFIG Version 3.2 Patchlevel 2 (Jul. 2, 1998) Users Manual (Edition 1.0)" Internet Document [Online] Jul. 2, 1998 XP002229137 Retrieved from the Internet: <URL:http://www.ice.mtu.edu/online_docs/xfig332/> [retrieved on Jan. 28, 2003].

Usdin Tommie et al.; Not a; "XML: Not a Silver Bullet But a Great Pipe Wrench" Standardview vol. 6. No. 3 Sep. 1998 pp. 125-132.

Chien Shu-Yao et al.; "Efficient Management of Multiversion Documents by Object Referencing" Proceedings of the 27th VLDB Conference 2001 pp. 291-300.

Chien Shu-Yao et al.; "Efficient schemes for managing mulitversion XML documents" VLDB Journal (2002) pp. 332-352.

Chien Shu-Yao et al.; "Storing and Querying Multiversion XML Documents using Durable Node Numbers" IEEE 2002 pp. 232-241.

Chien Shu-Yao et al.; "XML Document Versioning" SIGMOD Record vol. 30 No. 3 Spet 2001 pp. 46-53.

Dyck Timothy; "XML Spy Tops as XML Editor" http://www.eweek.com/article2/0395972404100.asp Nov. 25, 2002 4 pages.

Haukeland Jan-Henrick; "Tsbiff—tildeslash bill—version 1.2.1" Internet Document [Online] Jun. 1999 URL: http://web.archive.org/web/19990912001527/http://www.tildeslash.com/tsbiff/.

Nelson Mark; "Validation with MSXML and XML Schema" Windows Developer Magazine Jan. 2002 pp. 35-38.

Netscape Communication Corpora; "Netscape Communicator 4.61 for OS/2 Warp" Software 1999 the whole software release & "Netscape—Version 4.6 [en]-010615" Netscape Screenhot Oct. 2, 2002.

Noore A.; "A secure conditional access system using digital signature and encryption" 2003 Digest of Technical Papers. International Conference on Consumer Electronics Jun. 2003 pp. 220-221.

Rogge et al.; "Validating MPEG-21 Encapsulated Functional Metadata" IEEE 2002 pp. 209-212.

Wong Raymond K. et al.; "Managing and Querying Multi-Version XML Data with Update Logging" DocEng '02 Nov. 8-9, 2002 Copyright 2002 ACM 1-58113-594-7/02/0011 pp. 74-81.

Cheng Ya Bing et al.; "Designing Valid XML Views" ER 2002 LNCS 2503 2002 Springer-Verlag Berlin Heidelberg 2002 pp. 463-477.

Chuang Tyng-Ruey; "Generic Validation of Structural Content with Parametric Modules" ICFP '01 Sep. 3-5, 2001 Copyright 2001 ACM 1-58113-415-0/01/0009 pp. 98-109.

Dayton Linnea and Jack Davis; "Photo Shop 5/5.5 WOW! Book" 2000 Peachpit Press pp. 8-17.

Hall Richard Scott; "Agent-based Software Configuration and Deployment" Thesis of the Univeristy of Colorado Online Dec. 31, 1999 retrieved from the Internet on Nov. 7, 2003: <http://www.cs.colorado.edu/users/rickhall/documents/ThesisFinal.pdf> 169 pages.

Hardy Mathew R. B. et al; "Mapping and Displaying Structural Transformations between XML and PDF" DocEng '02 Nov. 8-9, 2002 Copyright 2002 ACM 1-58113-597-7/02/0011 pp. 95-102.

Kim Sang-Kyun et al.; "Immediate and Partial Validation Mechanism for the Conflict Resolution of Update Operations in XML Databases" WAIM 2002 LNCS 2419 2002 pp. 387-396 Springer-Veriag Berlin Heidelberg 2002.

Netscape Communication Corp; "SmartUpdate Developer's Guide" Online Mar. 11, 1999 retrieved from the Internet on Dec. 8, 2000: <http://developer.netscape.com:80/docs/manuals/communicator/jarman/index.htm> 83 pages.

Tomimori et al.; "An Efficient and Flexible Access Control Framework for Java Programs in Mobile Terminals"; 22nd International Conference on Distributed Computing Systems Workshops; 2002; pp. 777-782.

Van Hoff Arthur et al.; "The Open Software Description Format" Online Aug. 13, 1997 retrieved from the Internet on Nov. 7, 2003: <http://www.w3.org/TR/NOTE-OSD> 11 pages.

Verlamis Iraklis et al.; "Bridging XML-Schema and relational databases. A System for generating and manipulating relational databases using valid XML documents." DocEng '01 Nov. 9-10, 2001 Copyright 2001 ACM 1-58113-432-0/01/0011 pp. 105-114.

Williams Sara and Charlie Kin; "The Component Object Model" A Technical Overview Oct. 1994 Microsoft Corp. pp. 1-14.

Pacheco et al., "Delphi 5 Developers Guide," Sams Publishing, 1999, Chapter 31 Section: Data Streaming, 6 pages.

"Netscape window," Netscape Screenshot Oct. 2, 2002.

Clarke P., "From small beginnings" Knowledge Management Nov. 2001, pp. 28-30.

Hwang et al., "Micro-Firewalls for Dynamic Network Security with Distributed Intrusion Detection"; IEEE International Symposium on Network Computing and Applications; 2001; pp. 68-79.

Kaiya et al., "Specifying Runtime Environments and Functionalities of Downloadable Components Under the Sandbox Mode"; International Symposium on Principles of Software Evolution; 2000; pp. 138-142.

Komatsu N. et al., "A Proposal on Digital Watermark in Document Image Communication and Its Application to Realizing a Signature" Electronics and Communications in Japan Part I: Communications vol. 73 No. 5, May 1990, pp. 22-33.

Sun Q. et al., "A robust and secure media signature scheme for JPEG images" Proceedings of 2002 IEEE Workshop on Multimedia Signal Processing, Dec. 2002, pp. 296-299.

Prevelakis et al., "Sandboxing Applications"; Proceedings of the FREENIX Track; 2001; pp. 119-126.

Schmid et al., "Protection Data from Malicious Software"; 18th Annual Computer Security Applications Conference; 2002; pp. 199-208.

Trupin J., "The Visual Programmer," Microsoft Systems Journal, Apr. 1996, pp. 103-105.

Zdonik S., "Object Management System Concepts," ACM, 1984, pp. 13-19.

"Store and Organize Related Project Files in a Binder," Getting Results with Microsoft Office, 1990, pp. 109-112.

Barker et al., "Creating In-Line Objects Within an Integrated Editing Environment," IBM Technical Disclosure Bulletin, vol. 27, No. 5, Oct. 1984, p. 2962.

Berg A., "Naming and Binding: Monikers" Inside OLE, 1995, Chapter 9, pp. 431-490.

Clapp D., "The NeXT Application Kit Part I: Non-Responsive Classes," The NeXT Bible 1990, Chapter 16, pp. 275-293.

DiLascia et al., "Sweeper" Microsoft Interactive Developer, vol. 1, No. 1, 1996, 27 pages.

Herzner et al., "CDAM—Compound Document Access and Management. An Object-Oriented Approach" Multimedia Systems Interaction and Applications, 1992, Chapter 3, pp. 17-36.

Kobayashi et al., "An Update on BTRON-specification OS Development" IEEE 1991 pp. 132-140.

Peterson B., "Unix Variants," Unix Review, vol. 10, No. 4, Apr. 1992, pp. 29-31.

Pike et al., "Plan 9 from Bell Labs" UKUUG, Summer 1990, 10 pages

Pike et al., "The Use of Name Spaces in Plan 9," Operating Systems Review vol. 27, No. 2, Apr. 1993, pp. 72-76.

Staneck W., "Internal and External Media" Electronic Publishing Unleashed, 1995, Chapter 22, pp. 510-542.

Clark James—W3C Editor; "XSL Transformation (XSLT) Verison 1.0" Nov. 16, 1999 W3C (MIT INRIA Kejo) pp. 1-156.

Description of Whitehill Composer software product producted by Whitehill Technologies Inc. available at <http://www.xml.com/pub/p/221> accessed on Apr. 8 2004, two pages.

McCright J.S.; "New Tool Kit to Link Groove with Microsoft Sharepoint" eWeek Enterprise News & Reviews Ziff Davis Media INc. Jul. 29, 2002 1 page.

Musgrave S; "Networking technology—impact and opportunities" Survey and Statistical Computing 1996. Proceedings of the Second ASC International Conference. Sep. 1996. pp. 369-378. London UK.

Rapaport L; "Get more from SharePoint" Transform Magazine vol. 11 No. 3. Mar. 2002 pp. 1315.

W3C Editor James Clark and Ste; "XML Path Language (XPath) Version 1.0" Nov. 16, 1999W3C (MIT INRIA Kejo) pp. 1-49.

OMG XML Metadata Interchange (XMI) Specification Version 1.2 Jan. 2002.

Hu, et al., "A Programmable Editor for Developing Structured Documents based on Bidirectional Transformations", ACM,(Aug. 2004), 178-179.

Bradley, Neil "The XML Companion, Third Edition", *Published by Addison Wesley Professional*, http://proquest.safaribooksonline.com0201770598,.http,(Dec. 12, 2001),1-18.

Klarlund, Nils "DSD: A Schema Language for XML", *ACM, FSMP Portland Oregon*, (2000),101-111.

Watt, Andrew "Microsoft Office Infopath 2003 Kick Start", (*Published by Sams*) *Print ISBN-10:0-672-32623-X*, (Mar. 24, 2004), 1-57.

Bray, Tim "Extensible Markup Language (XML)", http://www.textuality.com/sgml-erb/WD-xml.html, second named inventor Jean Paoli, third named inventor C.M. Sperberg-McQueen,(Feb. 10, 1998),37 Pages.

Kay, Michael "XSL Transfornmations (XSLT) Version 2.0", http://www.w3.org/TR/2005/WD-xsIt20-20050404, (04/205),1-374.

"XML Forms Architecture (XFA)", Retrieved from http://xml.coverpacies.ora/xfa.html on Aug. 17, 2006, Cover Pages Technology Reports,,(Jun. 16, 1999),p. 1.

Hall, Richard S., "Agent-based Software Configuration and Development", Retrieved from http://www.cs.colorado.edu/users/rickhall/documents/ThesisFinal.pdf on Nov. 7, 2003, Thesis of the University of Colorado,(Dec. 31, 1999),169 pages.

McCright, J.S. "New Tool kit to Link Groove with Microsoft SharePoint", eWeek, Enterprise News & Reviews, Ziff Davis Media Inc. Retrieved from <http://www.eweek.com/c/a/Enterprise-Applications/New-Tool-Kit-to-Link-Groove-With-Microsoft-SharePoint/>,(Jul. 29, 2002),p. 1.

"Copying the Search Form to Custom Pages in Windows SharePoint Services-based Web Sites", Retrieved from www.sharepointcustomization.com/resources/tipstricks/04wss-searchbox-tip.htm, Microsoft Corp,(2004),p. 1.

"Dreamweaver Technote: Changes in copying and pasting in Dreamweaver 4", http://store1.adobe.com/cfusion/knowledgebase/index.cfm?id=tn 15152, (Mar. 2001),pp. 1-2.

"How to create a template that makes it easy for users to 'fill in the blank' withough doing any programming,", Retrieved from http://word.mvps.org/FAQs/Customization/FillinTheBlanks.htm, (Apr. 2004),pp. 1-2.

Sutanthavibul, Supoj et al., "XFIG version 3.2 Patchlevel 2 (Jul. 2, 1998) Users Manual (Edition 1.0)", Retrieved from.www.ice.mtu.

edu/online docs/sfig332/ on Jan. 28, 2003, Internet Document. XP002229137,(Feb. 7, 1998),pp. 1-66.

"Netscape Communicator 4.61 for OS/2 Warp", Netscape Communication Corporation, Software 1999, The Whole software release & Netscape—Version 4.61 {en} -010615, Netscape Screenshot,,(Oct. 2, 2002).

Alschuler, Liora "A tour of XMetal", Retrieved from http://www.xml.com/pub/a/SeyboldReport/ip031102.html on Feb. 5, 2003, XML.com, Online! XP002230081,(Jul. 14, 1999),3 pages.

Davidow, Ari "XML Editors: Allegations of Functionality in search of Reality", Retrieved from www.ivritype.com/xml/, SP002230082,(1999),pp. 1-16.

Brogden, William "Arbortext Adept 8 Editor Review", Retrieved from www.xml.com/pub/a/1999/09/adept/AdeptRvw.htm on Feb. 5, 2003, O'Reilly XML.COM, Online!,(Sep. 22, 1999),pp. 1-4.

Haukeland, Jan-Henrick "Tsbiff-tildeslash biff—version 1.2.1", http://web.archive.org/web/19990912001527/http://www.tildeslash.com/tsbiff/., (Jun. 1999),pp. 1-2.

"Notice of Allowance", U.S. Appl. No. 10/404,312, (Jan. 12, 2009),12 pages.

"Final Office Action", U.S. Appl. No. 10/857,689, (Jan. 6, 2009),23 pages.

"Non Final Office Action", U.S. Appl. No. 10/977,198, (Feb. 2, 2009),15 pages.

"Non Final Office Action", U.S. Appl. No. 10/939,588, (Feb. 18, 2009),40 pages.

"Non final Office Action", U.S. Appl. No. 11/234,767, (Feb. 26, 2009),37 pages.

"Notice of Allowance", U.S. Appl. No. 11/167,514, (Mar. 11, 2009),6 pages.

"Non Final Office Action", U.S. Appl. No. 10/942,528, (Mar. 6, 2009),31 pages.

"Non Final Offfice Action", U.S. Appl. Appl. No. 11/170,521, (Jan. 21, 2009),86 pages.

"Foreign Office Action", Application Serial No. 2,412,611 (Feb. 9, 2009),6 pages.

"Foreign Office Action", Application Serial No. 200610003709.2, (Jan. 9, 2009),8 pages.

"EP Office Action", Application Serial No. 06111546.5, (Oct. 15, 2008),5 pages.

"Notice of Re-Examination", Application Serial No. 01813138.7, (Mar. 11, 2009),27 pages.

"Notice of Allowance", U.S. Appl. No. 10/988,718, (Apr. 9, 2009).

"Final Office Action", U.S. Appl. No. 11/107,347, (Apr. 2, 2009),15 pages.

"Restriction Requirement", U.S. Appl. No. 11/227,550, (Apr. 2, 2009),8 pages.

"Non Final Office Action", U.S. Appl. No. 10/955,665, (Apr. 2, 2009),19 pages.

"Non Final Office Action", U.S. Appl. No. 10/988,720, 19 pages.

"Final Office Action", U.S. Appl. No. 11/203,818, (Apr. 14, 2009),31 pages.

"Final Office Action", U.S. Appl. No. 11/044,106, (Apr. 12, 2009),20 pages.

"Final Office Action", U.S. Appl. No. 11/226,044, (Apr. 20, 2009),24 pages.

"Final Office Action", U.S. Appl. No. 11/056,500, (Apr. 16, 2009),10 pages.

"Final Office Action", U.S. Appl. No. 11/203,937, (May 7, 2009),13 pages.

"Non Final Office Action", U.S. Appl. No. 10/955,666, (May 7, 2009),28 pages.

"Non Final Office Action", U.S. Appl. No. 10/916,692, (Apr. 30, 2009),14 pages.

"HP Blade Sever BH Series Operating System Guide", Hewlett-Packard,(Jul. 2002).

"Non Final Office Action", U.S. Appl. No. 09/599,809, (May 13, 2009).

"Non Final Office Action", U.S. Appl. No. 11/295,178.

"Non Final Office Action", U.S. Appl. No. 10/990,152.

"Final Office Action", U.S. Appl. No. 11/036,910, (Jun. 1, 2009),15 pages.

"Non Final Office Action", U.S. Appl. No. 10/857,689, (Jun. 11, 2009),25 pages.

"Non Final Office Action", U.S. Appl. No. 11/095,254, (Jun. 8, 2009),21 pages.

"Final Office Action", U.S. Appl. No. 11/234,767, 24 pages.

Acklen, et al., "Using Corel WordPerfect 9", Que Corporation,,(1998),pp. 251-284, 424-434, 583-585.

"Foreign Office Action", Application Serial No. 2002-503702, Final Notice of Rejection,(Jun. 5, 2009),212 pages.

Kaori, Iwantani et al., "Perfect Manual of Clarisworks 4.0 for Macintosh", 1st Edition, Japan,(Jul. 22, 1997),pp. 153-167.

Noriko, Matsushita "Step-up Training of Clarisworks (tabulation), Successful Use of Spreadsheet and Tabulation", Mac People, vol. 4, No. 19,(Oct. 1, 1998),pp. 138-139.

Akihiro, Senda "Word 2000, Conservative-Looking but 'Attentive' New Function", NIKKEI PC 21, vol. 4, No. 8,(Aug. 1, 1999),pp. 115-116.

Yasuji, Fukuhara "Clarisworks, Introduction to Business Document Construction, No. 4, Estimate", NIKKKEI MAC, No. 14,(May 17, 1994),pp. 197-204.

Reagan, Moore W., et al., "Collection-based persistent digital archives", U.S. Appl. No. 60/191,662, filed Mar. 23, 2000, 133.

"Non-Final Office Action", U.S. Appl. No. 11/227,550, (Aug. 3, 2009),45 pages.

"Notice of Allowance", U.S. Appl. No. 11/203,937 (Aug. 3, 2009),107 pages.

"Foreign Office Action", Application Serial No. 200610051554.X, (Jul. 10, 2009),11 pages.

"Non-Final Office Action", U.S. Appl. No. 11/234,767, 150 Pages.

"Architecture for a Dynamic Information Area Control", IBM Technical Disclosure Bulletin, IBM Corp, NY, US vol. 37, No. 10, Jan. 10, 1994, pp. 245-246.

"Copying the Search Form to Custom Pages in Windows SharePoint Services-based Web Sites", *CyBOOK, Inc.*, Jul. 26, 2004, Internet Article,(2004), 1 page.

"Excel Developer Tip: Determining the Data Type of a Cell" Reterived from <http://jwalk.com/ss/excel/tips/tip62.htm>, (May 13, 1998), 1 page.

"Final Office Action", U.S. Appl. No. 11/227,550, (Jan. 19, 2010), 12 pages.

"Final Office Action", U.S. Appl. No. 11/234,767, (Jan. 26, 2010), 23 pages.

"Final Office Action", U.S. Appl. No. 11/295,178, (Dec. 24, 2009), 38 pages.

"Foreign Notice of Allowance", Mexican Application No. PA/a/2005/012067, (Nov. 13, 2009), 3 pages.

"Foreign Office Action", Application Serial No. 200610051544.X, (Dec. 4, 2009), 9 pages.

"Non-Final Office Action", U.S. Appl. No. 10/402,640, (Dec. 30, 2009), 16 pages.

"Non-Final Office Action", U.S. Appl. No. 11/170,521, (Dec. 17, 2009), 11 pages.

"Non-Final Office Action", U.S. Appl. No. 11/218,149, (Jan. 14, 2010), 15 Pages.

"Non-Final Office Action", U.S. Appl. No. 12/021,894, (Dec. 31, 2009), 10 pages.

"Notice of Allowance", U.S. Appl. No. 10/990,152, (Dec. 21, 2009),6 pages.

"Notice of Allowance", U.S. Appl. No. 11/072,087, (Feb. 23, 2010), 4 pages.

"Notice of Allowance", U.S. Appl. No. 11/872,703, (Jan. 27, 2010), 19 pages.

"OMG XML Metadata Interchange (XMI) Specification", Reterived from: <http://www.omg.org/cgi-bin/doc?formal/02-01-01.pdf> on Dec. 2, 2009, Version.1.2,(Jan. 2002), 268 pages.

"SmartUpdate Developer's Guide", Retrieved from http://developer.netscapte.com:80/docs/manuals/communicator/jarman/index.htm on Dec. 8, 2000, Netscape Communications Corp,(Mar. 11, 1999), 83 pages.

"Stack Algorithm for Extracting Subtree from Serialized Tree ", TDB-ACC-No; NN94033, (Mar. 1, 1994), 2 pages.

"Store and Organize Related Project Files in a Binder", Getting results with Microsoft Office,(1990), pp. 109-112.

"Streamlining Content Creation", Ixia Soft Jun. 6, 2002, pp. 1-16.

"Supplemental Notice of Allowance", U.S. Appl. No. 10/955,665, (Dec. 30, 2009), 2 pages.

"Supplemental Notice of Allowance", U.S. Appl. No. 10/955,665, (Feb. 4, 2010), 2 pages.

"Supplemental Notice of Allowance", U.S. Appl. No. 10/955,665, (Nov. 27, 2009), 2 pages.

"Validation with MSXML and XML Scheme", *Windows Developer Magazine*, (Jan. 1, 2002), 5 pages.

"Whitehill Composer Software product", Reterived from www.xml.com/pub/p/221 on Apr. 8, 2004, Whitehill Technologies, Inc., (Apr. 8, 2004), 2 pages.

Altova, "XML Spy 4.0 Manual", 1998-2001 *Altova Inc. & Altova GmbH*, (Sep. 10, 2001),pp. 1-90, 343-362.

Altova, et al., "XML Spy, XML Integrated Development Environments", Altova Inc.,(2002), pp. 1-18.

Au, Irene et al., "Netscape Communicator's Collapsible Toolbars", CHI 98, Human Factors in Computing Systems, Conference Proceedings, LA, CA,(Apr. 18-23, 1998), pp. 81-86.

Barker, et al., "Creating In-Line Objects Within an Integrated Editing Environment", IBM Technical Disclosure Bulletin, vol. 27, No. 5,(Oct. 1984), p. 2962.

Battle, Steven A., et al., "Flexible Information Presentation with XML", *The Instituton of Electrical Engineers*, (1998), 6 pages.

Ben-Natan, Ron et al., "Internet Platform for Creating and Supporting Communities", U.S. Appl. No. 60/203,081, filed May 9, 2000, 31 pages.

Berg, A "Naming and Binding; Monikers", *Inside OLE, Chapter 9, Harmony Books*, (1995), pp. 431-490.

Chen, YA B., et al., "Designing Valid XML Views", *S. Spaccapietra, S.T. March, and Y. Kambayashi (Eds.): ER 2002, LNCS 2503*, Copyright: Springer-Verlag Berlin Heidelberg 2002,(2002), pp. 463-477.

Chen, Yi et al., "XKvalidator: A Constraint Validator for XML", *CIKM '02*, Nov. 4-9, 2002, McLean, VA USA, Copyrigth 2002, ACM, ISBN 1-58113-492-4/02/0011, (Nov. 4-9, 2002), pp. 446-452.

Chien, et al., "Efficient Management of Multiversion Documents by Object Referencing", Proceedings of the 27th VLDB Conference,(2001), pp. 291-300.

Chien, Shu-Yao et al., "Efficient Schemes for Managing Multiversion XML Documents", *The VLDB Journal 2002*, (Dec. 19, 2002), pp. 332-353.

Chien, Shu-Yao et al., "Storing and Querying Multiversion XML Documents using Durable Node Numbers", IEEE,(2002), pp. 232-241.

Chien, Shu-Yoa et al., 'XML Document Versioning', SIGMOD Record, vol. 30, No. 3,,(Sep. 2001), pp. 46-53.

Chuang, Tyng-Ruey "Generic Validation of Structural Content with Parametric Module",*ICFP 2001 International Conference on Functional Programming*, vol. 36, No. 10, Available at <http://citeseerx.istpsu.eduy/viewdoc/download?doi=10.1.1.7.6412&rep=rep1&type=pdf>, (Sep. 3, 2001), 12 pages.

Ciancarini, Paolo A., et al., "Managing Complex Documents Over the WWW: A Case Study for XML", *Transactions on Knowledge and Data Engineering*, vol. 11, No. 4, Available at <http://citeseerx.ist.psu.edu/viewdoc/download?doi=10.1.1.18.1679&rep=rep1&type=pdf>, (Apr. 1999), pp. 1-14.

Clapp, D "The NeXT Applicaton Kit Part 1: Non-Responsive Classes", *The NeXT Bible Chapter 16*, (1990), pp. 275-293.

Clark, James "XSL Transformation (XSLT), Version 1.0", Reterived from: <www.w3.org/TR/199/REC-Xslt-1999116>on Oct. 26, 2009, WC3, (Nov. 16, 1999), 57 pages.

Clark, James et al., "XML Path Language (XPath)", Retrieved from: <www.w3.org/TR/1999/RCE-xpath-19991116> on Oct. 26, 2009, Version 1.0, (Nov. 16, 1999), 37 pages.

Clark, Peter "From Small Begini9ngs", *Knowledge Management*, (Nov. 2001), pp. 28-30.

Cover, Robin "XML Forms Architecture (XFA)", Cover Pages Retrieved from "http://xml.coverpages.org/xfa.htm" on Aug. 17, 2006, (Apr. 19, 2000), 4 pages.

Dayton, Linnea et al., "Photo Shop 5/5.5 WOW! Book", 2000, Peachpit Press,(2000), pp. 8-17.

Dilascia, Paul et al., "Sweeper", *Microsoft interactive developer* , vol. 1,, No. 1, (1996), pp. 16-52.

Dorward, Sean et al., "Unix Variants", *Unix Review*, vol. 10, No. 4, (Apr. 1992), pp. 29-31.

Dyck, Timothy "XML Spy Tops as XML Editor", *eWeek*, vol. 19, No. 47, (Nov. 25, 2002), 3 pages.

Halberg, et al., "Using Microsoft Excel 97", Que Corporation,,(1997), pp. 1-9, 18-25, 85-89, 98-101, 106-113, 124-127, 144-147, 190-201, 209-210, 213-227, 581-590, 632-633, 650-655, 712-714.

Han, Richard et al., "Websplitter: A Unified XML Framework for Multi-Device Collaborative Web Browsing" *ACM Conference on Computer Supported Cooperative Work*, (2000), 10 pages.

Hardy, Matthew R.,et al., "Mapping and Displaying Structural Transformations between XML and PDF", *Proceedings of the 2002 ACM symposium on Document engineering*, (Nov. 8-9, 2002), pp. 95-102.

Herzner, Wolfgang et al., "CDAM-Compound Document Access and Management. An Object-Oriented Approach", *ACM SIGOIS Bulletin*, vol. 12, Issue 1 MultiMedia Systems Interaction and Applications, Chapter 3,,(Jul. 1991), 18 pages.

Honkala, Mikko et al., "Multimodal Interaction with XForms", ICWE '06 (2006), pp. 201-208.

Hwang, Kai et al., "Micro-Firewalls for Dynamic Network Security with Distributed Intrusion Detection", *IEEE International Symposium on Network Computing and Applications 2001*,(2001), pp. 68-79.

Kaiya, Haruniko et al., "Specifying Runtime Environments and Functionalities of Downloadable Components under the Sandbox Model", *International Symposium on Principles of Software Evolution 2000*, (2000), pp. 138-142.

Kanemoto, Hirotaka et al., "An Efficiently Updatable Index Scheme for Structured Documents", DEXA'98 (1998), pp. 991-996.

Kim, Sang-Kyun et al., "Immediate and Partial Validation Mechanism for the Conflict Resolution of Update Operations in XML Databases" *WAIM 2002, LNCS 2419*, 2002, Springer-Verlag Berlin Heidelberg, (2002), pp. 387-396

Kobayashi, M. et al., "An Update on BTRON-specification OS Development", *Proceedings of the 8thTRON Project Symposium*, 1991, 0-8186-2475-2/91,(1991), pp. 132-140.

Komatsu, Naohisa et al., "A Proposal on Digital Watermark Communication in Document Image and it's Application to Realizing a Signature", *Electronics and Communication in Japan, Part I: Communications*, vol. 73, No. 5, (May 1990), pp. 22-33.

Kutay, Ali et al., "Methods and Systems for Accessing, Organizing, Presenting and Viewing Data", U.S. Appl. No. 60/209,713, Kutay et al., filed Jun. 5, 2000, 345 pages.

Leblond, et al., "PC Magazine Guide to Quattro Pro for Windows", Ziff-Davis Press,(1993), pp. 9-11, 42-61.

Mansfield, Ron "Excel 97 for Busy People", Osborne/McGraw-Hill,, (Jan. 27, 1997), pp. 48-50.

Musgrave, S "Networking Technology—Impact and Opportunities", *Survey and Statistical Computing 1996, Proceeding of the Second ASC International Conference*, London, UK., (Sep. 1996), pp. 369-378.

Noore, Afzel "A Secure Conditional Access System Uisng Digital Signature and Encryption", *International Conference on Consumer Electronics*, (Jun. 2003), pp. 220-221.

Pike, Rob et al., "Plan 9 From Bell Labs", AT&T Bell Laboratories, UKUUG, Summer 1990, 10 pages.

Pike, Rob et al., "The Use of Name Spaces in Plan 9", *Operating Systems Review*, vol. 27, No. 2, (Apr. 1993), pp. 72-76.

Prevelakis, Vassilis et al., "Sandboxing Applications", *Freenix Track: 2001 USENIX Anuual Technical Conference*, (2001), pp. 119-126.

Raggett, "HTML Tables", Retrieved from: <http:www.//is-edu.homuns.edu.vn/WebLib/books/Web/Tel/htm13-tables.html> on Aug. 6, 2006, W3C Internet Draft,(Jul. 7, 1995), pp. 1-12.

Rapaport, Lowell "Get More From SharePoint", *Transform Magazine*, vol. 11, No. 3, (Mar. 2002), 2 pages.

Rogge, Boris et al., "Validating MPEG-21 Encapsulated Functional Metadata", *IEEE 2002*, ISBN 0-7803-7304-9/02,(2002), pp. 209-212.

Schmid, Mathew et al., "Protecting Data from Malicious Software", *18th Annual Security Applications Conference*, (2002), pp. 199-208.

Staneck, W "Internal and External Media", Electronic Publishing Unleashed, Chapter 22,,(1995), pp. 510-542.

Sun, Q et al., "A Robust and Secure Media Signature Scheme for JPEG Images", Proceeding of 2002 IEEE Workshop on Multimedia Signal Processing,(Dec. 2002), pp. 296-299.

Tomimori, Hiroyuki et al., "An Efficient and Flexible Access Control Framework for Java Programs in Mobile Terminals", Proceeding of 22nd Int'l Conference on Distributed Computing Systems Workshops,(2002), pp. 777-782.

Trupin, J "The Visual Programmer", Microsoft Systems Journal,(Apr. 1996), pp. 103-105.

Usdin, Tommie et al., "XML: Not a Silver Bullet, But a Great Pipe Wrench", *Standard View* vol. 6, No. 3, (Sep. 2, 1998), pp. 125-132.

Varlamis, Iraklis et al., "Bridging XML-Schema and relational database. A System for generating and manipulating relational databases using valid XML documents", DocEng 01, ACM 1-58113-432-0/01/0011,(Nov. 9-10, 2001), pp. 105-114.

Williams, Sara et al., "The Component Object Model: A Technical Overview", Microsoft Corp,(Oct. 1994), pp. 1-14.

Wong, Raymond K., et al., "Managing and Querying Multi-Version XML Data with Update Logging", *DocEng '02*, (Nov. 8-9, 2002), 8 pages.

Zdonik, S "Object Management System Concepts", ACM,(1984), pp. 13-19.

Van Hoff, Arthur et al., "The Open Software Description Format", Retrieved from: <www.w3.org/TR/NOTE-OSD> on May 18, 2009, (Aug. 13, 1997),10 pages.

"Final Office Action", U.S. Appl. No. 10/977,198, (Aug. 19, 2009),15 pages.

"Non-Final Office Action", U.S. Appl. No. 10/939,588, (Aug. 27, 2009),28 pages.

"Final Office Action", U.S. Appl. No. 11/170,521, (Sep. 8, 2009),12 pages.

"Final Office Action", U.S. Appl. No. 10/402,640, (Aug. 28, 2009),17 pages.

"Notice of Allowance", U.S. Appl. No. 11/203,937, Supplemental,(Sep. 15, 2009),2 pages.

"Final Office Action", U.S. Appl. No. 10/942,528, (Sep. 17, 2009),27 pages.

"Non-Final Office Action", U.S. Appl. No. 11/107,347, (Sep. 17, 2009),9 pages.

"Notice of Allowance", U.S. Appl. No. 10/988,720, (Sep. 17, 2009),18 pages.

"Non-Final Office Action", U.S. Appl. No. 11/044,106, (Sep. 24, 2009),17 pages.

"Notice of Allowance", U.S. Appl. No. 11/203,937, (Aug. 31, 2009),2 pages.

"Non-Final Office Action", U.S. Appl. No. 11/567,149, (Sep. 8, 2009),5 pages.

"Final Office Action", U.S. Appl. No. 10/955,666, (Oct. 14, 2009),24 pages.

"Advisory Action", U.S. Appl. No. 10/942,528, (Oct. 26, 2009),3 pages.

"Non-Final Office Action", U.S. Appl. No. 11/557,931, (Oct. 20, 2009),27 pages.

Webopedia, "Definition of OLE", Retrieved from: <http://www.webopedia.com/TERM/O/OLE.html>, (May 16, 1998),3 pages.

Webopedia, "Definition of OpenDoc", Retrieved from: <http://www.webopedia.com/TERM/O/OpenDoc.html>,(Sep. 18, 1997),3 pages.

Webopedia, "Definition of Network", Retrieved from: <http://www.webopedia.com/TERM/n/network.html>,(Sep. 1, 1996), 2 pages.

"Notice of Allowance", U.S. Appl. No. 10/955,665, (Nov. 3, 2009),8 pages.

"Final Office Action", U.S. Appl. No. 10/916,692, (Nov. 16, 2009),10 pages.

"Final Office Action", U.S. Appl. No. 11/218,149, (Nov. 16, 2009),18 pages.

"Final Office Action", U.S. Appl. No. 11/072,087, (Nov. 16, 2009),9 pages.

"Non-Final Office Action", U.S. Appl. No. 11/036,910, (Nov. 13, 2009),9 pages.

"Notice of Allowance", U.S. Appl. No. 11/095,254, (Nov. 18, 2009),8 pages.

"Foreign Office Action", Mexican Patent Application No. PA/a/2006/002493, (Sep. 14, 2009),5 pages.

"Notice of Allowance", U.S. Appl. No. 10/942,528, (Dec. 3, 2009),8 pages.

"Notice of Allowance", U.S. Appl. No. 11/056,500, (Dec. 2, 2009),17 pages.

"Final Office Action", U.S. Appl. No. 11/107,347, (Mar. 22, 2010),11 pages.

"Non-Final Office Action", U.S. Appl. No. 10/402,640, (Apr. 30, 2010),4 pages.

"Non-Final Office Action", U.S. Appl. No. 10/916,692, (Apr. 5, 2010),6 pages.

"Non-Final Office Action", U.S. Appl. No. 11/227,550, (Mar. 10, 2010),12 pages.

"Notice of Allowance", U.S. Appl. No. 10/939,588, (Mar. 10, 2010),10 pages.

"Notice of Allowance", U.S. Appl. No. 11/044,106, (Mar. 15, 2010),7 pages.

"Supplemental Notice of Allowance", U.S. Appl. No. 10/955,665, (Mar. 5, 2010),2 pages.

"Supplemental Notice of Allowance", U.S. Appl. No. 10/990,152, (Apr. 19, 2010),2 pages.

"Supplemental Notice of Allowance", U.S. Appl. No. 11/072,087, (Apr. 19, 2010),2 pages.

"Final Office Action", U.S. Appl. No. 11/036,910, (May 26, 2010), 9 pages.

"Final Office Action", U.S. Appl. No. 11/170,521, (Jun. 29, 2010), 13 pages.

"Final Office Action", U.S. Appl. No. 11/218,149, (May 19, 2010), 17 pages.

"Foreign Office Action", Australian Patent Application No. 2006200285, (May 20, 2010), 2 pages.

"Foreign Office Action", European Patent Application No. 01939368.5, (Feb. 25, 2010), 3 pages.

"Foreign Office Action", Russian Application No. 2006103267, (Apr. 20, 2010), 10 pages.

"Foreign Office Action", Russian Application No. 2006105526, (Apr. 15, 2010), 10 pages.

"Non-Final Office Action", U.S. Appl. No. 11/295,178, (May 26, 2010), 45 pages.

"Non-Final Office Action", U.S. Appl. No. 11/567,140, (May 18, 2010), 8 pages.

"Notice of Allowance", U.S. Appl. No. 10/402,640, (Jun. 15, 2010), 6 pages.

"Notice of Allowance", U.S. Appl. No. 10/916,692, (Jun. 14, 2010), 6 pages.

"Notice of Allowance", U.S. Appl. No. 11/557,931, (May 5, 2010), 7 pages.

"Notice of Allowance", U.S. Appl. No. 11/872,703, (May 14, 2010), 18 pages.

"Supplemental Notice of Allowance", U.S. Appl. No. 11/044,106, (May 13, 2010), 6 pages.

"Supplemental Notice of Allowance", U.S. Appl. No. 11/044,106, (May 19, 2010), 5 pages.

"European Search Report", EP Application No. 06111546.5, (Nov. 9, 2006),5 pages.

"Final Office Action", U.S. Appl. No. 10/402,640, (Sep. 10, 2007),16 pages.

"Final Office Action", U.S. Appl. No. 10/955,087, (May 16, 2008),13 pages.

"Final Office Action", U.S. Appl. No. 10/955,666, (Oct. 31, 2008),24 pages.

"Final Office Action", U.S. Appl. No. 10/955,666, (Aug. 30, 2007),19 pages.

"Final Office Action", U.S. Appl. No. 10/977,198, (Sep. 3, 2008),13 pages.

"Final Office Action", U.S. Appl. No. 10/977,198, (Oct. 11, 2007),10 pages.

"Final Office Action", U.S. Appl. No. 10/988,718, (Jan. 30, 2008),15 pages.

"Final Office Action", U.S. Appl. No. 10/988,718, (Dec. 22, 2008),17 pages.

"Final Office Action", U.S. Appl. No. 10/988,732, (Nov. 13, 2009),33 pages.

"Final Office Action", U.S. Appl. No. 10/988,732, (Dec. 10, 2008), 29 pages.
"Final Office Action", U.S. Appl. No. 11/012,472, (Mar. 23, 2010), 10 pages.
"Final Office Action", U.S. Appl. No. 11/227,550, (Aug. 19, 2010), 12 pages.
"Final Office Action", U.S. Appl. No. 11/295,178, (Jul. 30, 2010), 43 pages.
"Final Office Action", U.S. Appl. No. 11/567,140, (Aug. 19, 2010), 10 pages.
"Foreign Decision of Grant", Russian Application No. 2006103267, (Aug. 13, 2010), 18 pages.
"Foreign Office Action", Chinese Application No. 200610051554.X, (Jun. 25, 2010), 10 pages.
"Foreign Office Action", EP Application No. 01935325.9, (Jul. 20, 2010), 6 pages.
"Foreign Office Action", Japanese Application No. 2002-530701, (Aug. 10, 2010), 11 pages.
"Foreign Office Action", Russian Application No. 2006105526, (Aug. 24, 2010), 4 pages.
"Issue Notification", U.S. Appl. No. 10/955,087, (Mar. 18, 2009), 1 page.
"Issue Notification", U.S. Appl. No. 10/988,718, (Aug. 12, 2009), 1 page.
"Issue Notification", U.S. Appl. No. 11/095,254, (Feb. 10, 2010), 1 page.
"Issue Notification", U.S. Appl. No. 11/276,585, (Jan. 21, 2009), 1 page.
"Lotus Notes Release 5, Step by Step", *Lotus Development Corporation,* (1999), 224 pages.
"Netscape Window", *Netscape Screenshot*, (Oct. 2, 2002), 1 page.
"Non Final Office Action", U.S. Appl. No. 10/402,640, (Oct. 6, 2006), 15 pages.
"Non Final Office Action", U.S. Appl. No. 10/402,640, (Feb. 12, 2008), 16 pages.
"Non Final Office Action", U.S. Appl. No. 10/402,640, (Apr. 25, 2007), 16 pages.
"Non Final Office Action", U.S. Appl. No. 10/402,640, (Sep. 8, 2008), 16 pages.
"Non Final Office Action", U.S. Appl. No. 10/955,087, (Nov. 19, 2007), 22 pages.
"Non Final Office Action", U.S. Appl. No. 10/955,666, (Dec. 26, 2006), 20 pages.
"Non Final Office Action", U.S. Appl. No. 10/955,666, (Feb. 4, 2008), 20 pages.
"Non Final Office Action", U.S. Appl. No. 10/977,198, (Jan. 10, 2008), 10 pages.
"Non Final Office Action", U.S. Appl. No. 10/977,198, (Mar. 9, 2007), 9 pages.
"Non Final Office Action", U.S. Appl. No. 10/988,718, (Jan. 25, 2007), 13 pages.
"Non Final Office Action", U.S. Appl. No. 10/988,718, (Jul. 21, 2008), 18 pages.
"Non Final Office Action", U.S. Appl. No. 10/988,718, (Jul. 26, 2007), 21 pages.
"Non-Final Office Action", U.S. Appl. No. 10/854,961, (Nov. 15, 2006), 21 pages.
"Non-Final Office Action", U.S. Appl. No. 10/955,665, (Sep. 11, 2008), 16 pages.
"Non-Final Office Action", U.S. Appl. No. 10/988,732, (Apr. 1, 2008), 27 pages.
"Non-Final Office Action", U.S. Appl. No. 10/988,732, (May 26, 2010), 36 pages.
"Non-Final Office Action", U.S. Appl. No. 10/988,732, (Jun. 11, 2009), 30 pages.
"Non-Final Office Action", U.S. Appl. No. 11/012,472, (Oct. 6, 2009), 8 pages.
"Non-Final Office Action", U.S. Appl. No. 11/012,472, (Jul. 1, 2010), 9 pages.
"Non-Final Office Action", U.S. Appl. No. 11/036,910, (Aug. 19, 2010), 8 pages.
"Non-Final Office Action", U.S. Appl. No. 11/107,347, (Jul. 9, 2010), 16 pages.
"Non-Final Office Action", U.S. Appl. No. 11/218,149, (Sep. 20, 2010), 15 pages.
"Non-Final Office Action", U.S. Appl. No. 12/061,613, (Sep. 28, 2010), 9 pages.
"Notice of Allowance", U.S. Appl. No. 10/854,961, (Jun. 14, 2007), 12 pages.
"Notice of Allowance", U.S. Appl. No. 10/955,087, (Dec. 11, 2008), 10 pages.
"Restriction Requirement", U.S. Appl. No. 10/402,640, (Aug. 29, 2006), 5 pages.
"Restriction Requirement", U.S. Appl. No. 11/012,472, (Jun. 9, 2009), 7 pages.
Burch, Barbara "Notes R5 Technical Overview", Retrieved from: <http://www.ibm.com/developerworks/lotus/library/1s-Notes_R5_Technical_Overview> on Aug. 12, 2010, (Apr. 1, 1999), 14 pages.
Esposito, Dino "Cutting Edge No. 8", *Microsoft Internet Developer*, (Jan. 18, 2000), 13 pages.
Howlett, Scott et al., "A New Function for SQL Server 2000", *MSDN Magazine*, No. 1, (Mar. 2000), 9 pages.
"EP Search Report", Application Serial No. 07750552.7, EESR, (Sep. 30, 2009), 6 pages.
"Final Office Action", U.S. Appl. No. 10/988,732, (Nov. 12, 2010), 37 pages.
"Foreign Office Action", EP Application Number 05112241.4, (Dec. 23, 2010), 6 pages.
"Non Final Office Action", U.S. Appl. No. 09/599,086, (Oct. 31, 2007), 48 pages.
"Non Final Office Action", U.S. Appl. No. 11/159,911, (Jun. 30, 2009), 9 pages.
"Non-Final Office Action", U.S. Appl. No. 11/158,398, (May 13, 2010), 10 pages.
"Notice of Allowance", U.S. Appl. No. 11/036,910, (Dec. 7, 2010), 7 pages.
"Ranchero Software_Smart Lists", *Internet Article*, Retrieved from <http://web.archive.org/web/20050602084724/http://ranchero.com/netnewswire/features/smartLists.php> on Nov. 13, 2008, pp. 1-2.
"Search Engine Subscriptions", *Internet Article*, Retrieved from <http://web.archive.org/web/20051217013212/http://ranchero.com/netnewswire/helpBook/searchEngineSubs.html> on Nov. 13, 2008, 1 page.
"Syndic8.com—Documents2", *Internet Article*, Retrieved from <http://web.archive.org/web/20050622035505/http://www.syndic8.com/documents/howto/> on Nov. 13, 2008, pp. 1-3.
Blair, Eric "Review; NetNewsWire 2.0", Retrived from:<http://www.atmp.com/11.06/netnewswire.shtml> on Nov. 11, 2008, (Jun. 2, 2005), 12 pages.
Zaki, Mohammed J., et al., "Parallel Classification for Data Mining on Shared-Memory Multiprocessors", *ACM*, (Mar. 1999), pp. 1-8.
"Adobe GoLive 5.0: User Guide," Adobe Systems, 2000, Chapter 12., (2000), 11 pages.
"Advisory Action", U.S. Appl. No. 11/036,910, (Sep. 10, 2009), 3 pages.
"European Search Report", EP Application No. 10012887.5, (Jul. 4, 2011), 12 pages.
"European Search Report", European Application No. 10012887.5-2211, (Jul. 4, 2011), 11 pages.
"Final Office Action", U.S. Appl. No. 10/770,240, (Apr. 13, 2011), 17 pages.
"Final Office Action", U.S. Appl. No. 10/770,240, (Jun. 26, 2009), 15 pages.
"Final Office Action", U.S. Appl. No. 10/770,240, (Jun. 29, 2007), 28 pages.
"Final Office Action", U.S. Appl. No. 10/938,476, (Jun. 20, 2011), 19 pages.
"Final Office Action", U.S. Appl. No. 12/126,532, (Oct. 14, 2011), 25 pages.
"Foreign Notice of Allowance", Canadian Application No. 2412611, (Sep. 19, 2011), 1 page.
"Foreign Notice of Allowance", Japanese Application No. 2002-504581, (Sep. 16, 2011), 6 pages.
"Foreign Office Action", Canadian Application No. 2408527, (Sep. 27, 2011), 3 pages.

"Foreign Office Action", Japanese Application No. 2002-503700, (Aug. 30, 2011), 4 pages.
"Foreign Office Action", Japanese Application No. 200-504581, (Dec. 17, 2010), 24 pages.
"Foreign Office Action", Japanese Application No. 2002-504581, (May 27, 2011), 4 pages.
"Foreign Office Action", Japanese Application No. 2006-060050, (Aug. 26, 2011), 4 pages.
"Non-Final Office Action", U.S. Appl. No. 10/011,150, (May 19, 2005), 7 pages.
"Non-Final Office Action", U.S. Appl. No. 10/770,240, (Oct. 29, 2010), 14 pages.
"Non-Final Office Action", U.S. Appl. No. 10/770,240, (May 13, 2010), 15 pages.
"Non-Final Office Action", U.S. Appl. No. 11/036,910, (Aug. 3, 2011), 7 pages.
"Non-Final Office Action", U.S. Appl. No. 11/170,521, (Aug. 3, 2011), 16 pages.
"Notice of Allowance", U.S. Appl. No. 10/011,150, (Dec. 16, 2005), 4 pages.
"Notice of Allowance", U.S. Appl. No. 11/567,140, (Oct. 11, 2011), 11 pages.
"Notice of Allowance", U.S. Appl. No. 11/927,296, (Aug. 8, 2011), 7 pages.
"Notice of Allowance", U.S. Appl. No. 11/249,973, (Sep. 28, 2011), 9 pages.
"Restriction Requirement", U.S. Appl. No. 10/011,150, (Dec. 15, 2004), 5 pages.
"Supplementary European Search Report", Appliation No. 0479161.1, (Jul. 14, 2011), 4 pages.
"TEI: P4 Guidelines", *TEI Consortium*, (Mar. 2002), 340 pages.
"Text Encoding Initiative", *TEI Consortium*, (Mar. 2002), 1 page.
Duce, et al., "Web 2D Graphics File Formats", *Google 2003*, (2003), pp. 43-65.
Idle, et al., "Outline of the International Standard Linguistic Annotation Framework", *Proceedings of the ACL 2003 workshop on Linguistics Annotation*, (Jul. 2003), 5 pages.
Mengel, A et al., "MATE Dialogue Annotation Gudelines", http://www.ims.uni-stuttgart.de/projekte/mate/mdag, (Jan. 8, 2000), 64 pages.
Zdonik, Stanley B., "Object Management System Concepts", *Supporting Intergarted Office Workstation Applications, Doctoral Thesis, Massachusetts institute of Technology*, (1983), 262 pages.
"Final Office Action", U.S. Appl. No. 11/234,767, (Mar. 10, 2011),28 pages.
"Final Office Action", U.S. Appl. No. 12/061,613, (Apr. 28, 2011),11 pages.
"Foreign Office Action", Japanese Application No. 2006-071589, (Mar. 29, 2011),9 pages.
"Non Final Office Action", U.S. Appl. No. 11/567,140, (Feb. 18, 2011),8 pages.
"Non-Final Office Action", U.S. Appl. No. 11/927,296, (Mar. 4, 2011),19 pages.
"Notice of Allowance", U.S. Appl. No. 11/295,178, (Mar. 22, 2011),20 pages.
"Supplemental Notice of Allowance", U.S. Appl. No. 11/218,149, (Apr. 5, 2011),2 pages.
"Supplemental Notice of Allowance", U.S. Appl. No. 11/931,730, (Mar. 2, 2011),2 pages.
"Supplemental Notice of Allowance", U.S. Appl. No. 11/931,730, (Apr. 22, 2011),2 pages.
"Supplemental Notice of Allowance", U.S. Appl. No. 11/931,730, (May 6, 2011),2 pages.
Prosise, Jeff "Programming Microsoft Net", retrieved from: <http://academic.safaribooksonline.com/print?xmlid=0-7356-1376-1/IDAVO3T> on Mar. 3, 2011, Microsoft Press,(May 15, 2002),24 pages.
Reilly, Douglas J., "Programming Microsoft Web Forms", retrieved from: <http://academic.safaribooksonline.com/print?xmlid=0735621799/systemdotwebdotuidotweb> on Mar. 3, 2011, Microsoft Press,(Nov. 2, 2005),52 pages.
"Foreign Office Action", Japanese Application No. 2002-503700, (May 10, 2011), 5 pages.

"Mott Porous Metal. The Most Reliable Means of Restricting Gas Flow", *Mott Corporation Webpage*, retrieved from<<http://www.mottcorp.com/industry/oem/oem_flowres.htm>> on Aug. 23, 2004, 4 pages.
"Non Final Office Action", U.S. Appl. No. 12/126,532, (Mar. 24, 2011), 23 pages.
"Non Final Office Action", U.S. Appl. No. 12/249,973, (Apr. 12, 2011), 8 pages.
"Notice of Reexamination", Chinese Application No. 01813138.7, (Apr. 22, 2011), 14 pages.
"Supplemental Notice of Allowance", U.S. Appl. No. 11/107,347, (Jun. 10, 2011), 10 pages.
"Supplemental Notice of Allowance", U.S. Appl. No. 11/218,149, (Jun. 6, 2011), 2 pages.
Altova, "www.xmlspy.com Spy 4 You User and Reference Manual Version 4.4", available at <http://v44.sw.altova.com/SpyManual44.pdf>,(May 24, 2002), pp. 1-605.
Hall, Richard S., "Evaluating Software Deployment Languages and Schema", in Proceedings of International Conference on Software Maintenance,(Nov. 1998), 9 pages.
Hall, Richard S., et al., "Specifying the Deployable Software Description Format in XML", *CU-SERL-207-99*, Software Engineering Research Laboratory, University of.Colorado at Boulder,(Mar. 31, 1999), 17 pages.
W3C, "XForms 1.0", retrieved from <file:///HI/NPL/W3C XForms1_0-Working Draft 20010216.thm> on Apr. 5, 2011,(Feb. 16, 2001), 4 pages.
"Final Office Action", U.S. Appl. No. 10/857,689, (Jan. 15, 2008),15 pages.
"Foreign Notice of Allowance", Application No. JP2006-060050,. (Dec. 1, 2011),6 pages.
"Foreign Notice of Allowance", Australian Application No. (Sep. 23, 2010),3 pages.
"Foreign Notice of Allowance", Canadian Application No. 2408527, (Apr. 17, 2012),1 page.
"Foreign Office Action", Canadian Application No. 2,408,313, (Jun. 18, 2012),7 pages.
"Foreign Office Action", Korean Application No. 10-2006-0003894, (Jun. 12, 2012),4 pages.
"Non Final Office Action", U.S. Appl. No. 10/857,689, (Dec. 17, 2009),19 pages.
"Non Final Office Action", U.S. Appl. No. 10/857,689, (Jun. 13, 2007),23 pages.
"Non Final Office Action", U.S. Appl. No. 10/857,689, (Jul. 18, 2008),18 pages.
"Notice of Allowance", U.S. Appl. No. 10/857,689, (May 14, 2010) 9 pages.
"Supplemental Notice of Allowance", U.S. Appl. No. 10/395,505, (Aug. 24, 2007),2 pages.
"Final Office Action", U.S. Appl. No. 10/609,274, (Oct. 3, 2008),50 pages.
"Final Office Action", U.S. Appl. No. 10/609,274, (Oct. 31, 2007),41 pages.
"Final Office Action", U.S. Appl. No. 11/927,296, (Jul. 7, 2011),12 pages.
"Foreign Office Action", European Patent Application No. 01935325.9, ( May 31, 2011),5 pages.
"Foreign Office Action", Japanese Application No. 2002-503701, (May 31, 2011),10 pages.
"Non Final Office Action", U.S. Appl. No. 10/609,274, (Jan. 17, 2007),43 pages.
"Non Final Office Action", U.S. Appl. No. 10/609,274, (Apr. 2, 2008),43 pages.
Moats, R. "A URN Namespace for IETF Documents", *RFC 2648*, (Aug. 1999),pp. 1-30.
Moats, R. "URN Syntax", *RFC 2141*, (May 1997),pp. 1-8.
Sollins, et al., "Functional Requirements for Uniform Resource Names", *RFC 1737*, (Dec. 1994),pp. 1-7.
"Extended European Search Report", EP Application No. 10012887.5, (Jul. 4, 2011),11 pages.
"Foreign Office Action", Japanese Application No. 2002-503701, (Mar. 16, 2012), 3 pages.

"Non-Final Office Action", U.S. Appl. No. 12/061,613, (Mar. 16, 2012), 12 pages.

"Non-Final Office Action", U.S. Appl. No. 12/694,836, (Mar. 9, 2012), 30 pages.

"Notice of Allowance", U.S. Appl. No. 11/170,521, (Jan. 19, 2012), 7 pages.

Dubinko, et al., "XForms 1.0", *W3C Recommendation*, Retrieved from: <www.w3.org.TR/2003/REC-xforms-20031014/>on Feb. 29, 2012, (Oct. 14, 2003), 35 pages.

"Final Office Action", U.S. Appl. No. 10/876,433, (Nov. 14, 2008), 31 pages.

"Final Office Action", U.S. Appl. No. 12/061,613, (Aug. 30, 2012), 14 pages.

"Final Office Action", U.S. Appl. No. 12/694,836, (Aug. 29, 2012), 27 pages.

"Foreign Office Action", Korean Application No. 10-2006-0012016, (Oct. 30, 2012), 6 pages.

"Foreign Office Action", Korean Application No. 10-2012-0054230, (Aug. 19, 2012), 9 pages.

"Foreign Office Action", Malaysian Application No. PI 20060743, (Jun. 8, 2012), 3 pages.

"Non Final Office Action", U.S. Appl. No. 10/876,433, (May 12, 2008), 26 pages.

"Non-Final Office Action", U.S. Appl. No. 12/722,414, (Aug. 15, 2012), 27 pages.

"Non-Final Office Action", U.S. Appl. No. 13/161,419, (Aug. 15, 2012), 7 pages.

"Notice of Allowance", U.S. Appl. No. 10/876,433, (Nov. 10, 2009), 13 pages.

"Summons to Attend Oral Proceedings", European Patent Application No. 01935325.9, (Sep. 7, 2012), 9 pages.

"The History of Notes and Domino", *developerWorks Technical Resource Portal*, Retrieved from: <http://www.ibm.com/developerworks/lotus/library/ls-NDHistory/> on Jul. 9, 2010, (Nov. 14, 2007), 18 pages.

Brabrand, Claus et al., "PowerForms: Declarative Client-Side Form Field Validation", *BRICS, Department of Computer Science, University of Aarhus*, Denmark, World Wide Web, vol. 3, No. 4, (2000), pp. 205-214.

Chan, Chee-Yong et al., "Efficient Filtering of XML Documents with XPath Expressions", The VLDB Journal (2002) 11, (Jun. 1, 2002), pp. 354-379.

Schmalstieg, Dieter et al., "Using Transparent Props for Interaction with the Virtual Table", *Proceedings of the 1999 symposium on Interactive 3D graphics.*, available at <http://citeseerx.ist.psu.edu/viewdoc/summary?doi=10.1.1.35.8236>, (Apr. 26, 1999), 8 pages.

"Final Office Action", U.S. Appl. No. 10/976,451, (Nov. 17, 2008), 9 pages.

"Foreign Notice of Allowance", Canadian Application No. 2533147, (Mar. 11, 2013), 1 page.

"Foreign Office Action", Canadian Application No. 2533147, (Jan. 25, 2013), 2 pages.

"Non-Final Office Action", U.S. Appl. No. 10/976,451, (Jul. 23, 2012), 9 pages.

"Non-Final Office Action", U.S. Appl. No. 10/976,451, (Aug. 20, 2008), 9 pages.

"Notice of Allowance", U.S. Appl. No. 12/028,651, (Jan. 3, 2013), 7 pages.

"Supplemental Notice of Allowance", U.S. Appl. No. 13/161,419, (Feb. 25, 2013).

"Supplemental Notice of Allowance", U.S. Appl. No. 13/161,419, (Mar. 25, 2013).

"Final Office Action", U.S. Appl. No. 12/694,836, (Apr. 24, 2013), 36 pages.

"Non-Final Office Action", U.S. Appl. No. 13/051,741, (Apr. 24, 2013), 11 pages.

"Foreign Office Action", Taiwan Application No. 095103951, (Nov. 8, 2102) 15 pages.

"Intention to Grant", European Patent Application No. 01935325.9, (Dec. 7, 2012), 7 pages.

"Notice of Allowance", U.S. Appl. No. 13/161,419, (Dec. 7, 2012), 5 pages.

"Taiwan Search Report", Taiwan Application No. 095103951, (Nov. 8, 2012), 1 page.

\* cited by examiner

Example Form

Please complete this form.

Name

How many cars do you have?
- ○ 1 ← 118
- ○ 2-3 ← 120
- ○ 4 or more ← 122
- ○ none ← 124

☑ Please check this box if you own a home ← 116

SYSTEMS AND METHODS FOR INTERACTING WITH A COMPUTER THROUGH HANDWRITING TO A SCREEN

TECHNICAL FIELD

This invention relates to interacting with a computer through handwriting.

BACKGROUND

Many computing devices, such as hand-held computers, PDAs, and Palm Pilots™, enable users to interact with the device by handwriting over the device's screen. This handwriting may be converted into text or a command that the device can understand.

Interacting with a computer through handwriting, however, can be counter-intuitive and problematic. Take, for instance, how users often select a control, such as a check box or radio button. Users may select a check box by "tapping" a stylus point within the box. Tapping within the box can be counter-intuitive because tapping may have to be learned; it is not like writing on a paper form, with which most users are already comfortable. Also, tapping to select a check box can be difficult on a small screen as the box into which a user taps may be quite small.

Take also, for instance, how users often interact with moving-input controls, like drag-and-move or drawing controls. When a user is handwriting in a mode that allows the handwriting to be interpreted as text, a user may none-the-less want to draw or use a control having a moving input. To do so, often a user must "tap-and-hold" the control. Suppose, for example, that a user is attempting to handwrite text into an existing word-processing document. Suppose also that the user wishes to scroll down to a particular place in the document. To do so, the user can use a slider-bar control. To use this control and scroll through the document, often the user must tap on the slider-bar and hold that tap down until the computer recognizes that the user is attempting to use the slider-bar rather than enter text. Having to tap and hold a control before using it can be counter-intuitive and difficult, especially for small controls on small screens.

These and similar problems can make interacting with computing devices through handwriting difficult and/or counter-intuitive.

SUMMARY

Systems and methods ("tools") are described that, in at least some embodiments, make more intuitive and/or effective interacting with a computing device through handwriting.

In some embodiments, for instance, these tools enable a user to select a control with a handwritten stroke at least part of which resides outside of a selectable area of the control.

In other embodiments, for instance, these tools enable a user to use a moving-input control without having to make a selection other than handwriting on, over, or near the control. In doing so, the tools may determine that the user intends the handwriting to be treated as input to a moving-input control rather than recognized as text.

In still other embodiments, for instance, the tools enable a user to delete text displayed on an electronic form by handwriting over the text.

BRIEF DESCRIPTION OF THE DRAWINGS

FIG. 4 illustrates the exemplary screen shot of FIG. 3 and a bounded writing area for the handwriting.

FIG. 10 illustrates the exemplary data-entry form of FIG. 1 and a screen shot showing text displayed in a data-entry field of the form with handwriting displayed over some of the text.

The same numbers are used throughout the disclosure and figures to reference like components and features.

DETAILED DESCRIPTION

Overview

Systems and methods ("tools") described below can, in at least some embodiments, make more intuitive and/or effective interacting with a computing device through handwriting.

In one embodiment, for instance, a user is able to select a control with a handwritten stroke at least part of which resides outside of a selectable area of the control. By so doing, users may to select a control without needing to tap inside a box or button of the control.

In another embodiment, for instance, a user is able to use a moving-input control without having to make a selection other than handwriting on, over, or near the control. The tools may determine, based in part on a geography of a user's handwriting, that the user intends the handwriting to be treated as input to a moving-input control rather than recognized as text.

Also, the tools may enable a user, in still another embodiment, to delete text displayed on an electronic form. The user may be able to delete text in a data-entry field, for instance, by handwriting over the text in the field.

Exemplary Architecture

Figure 1:
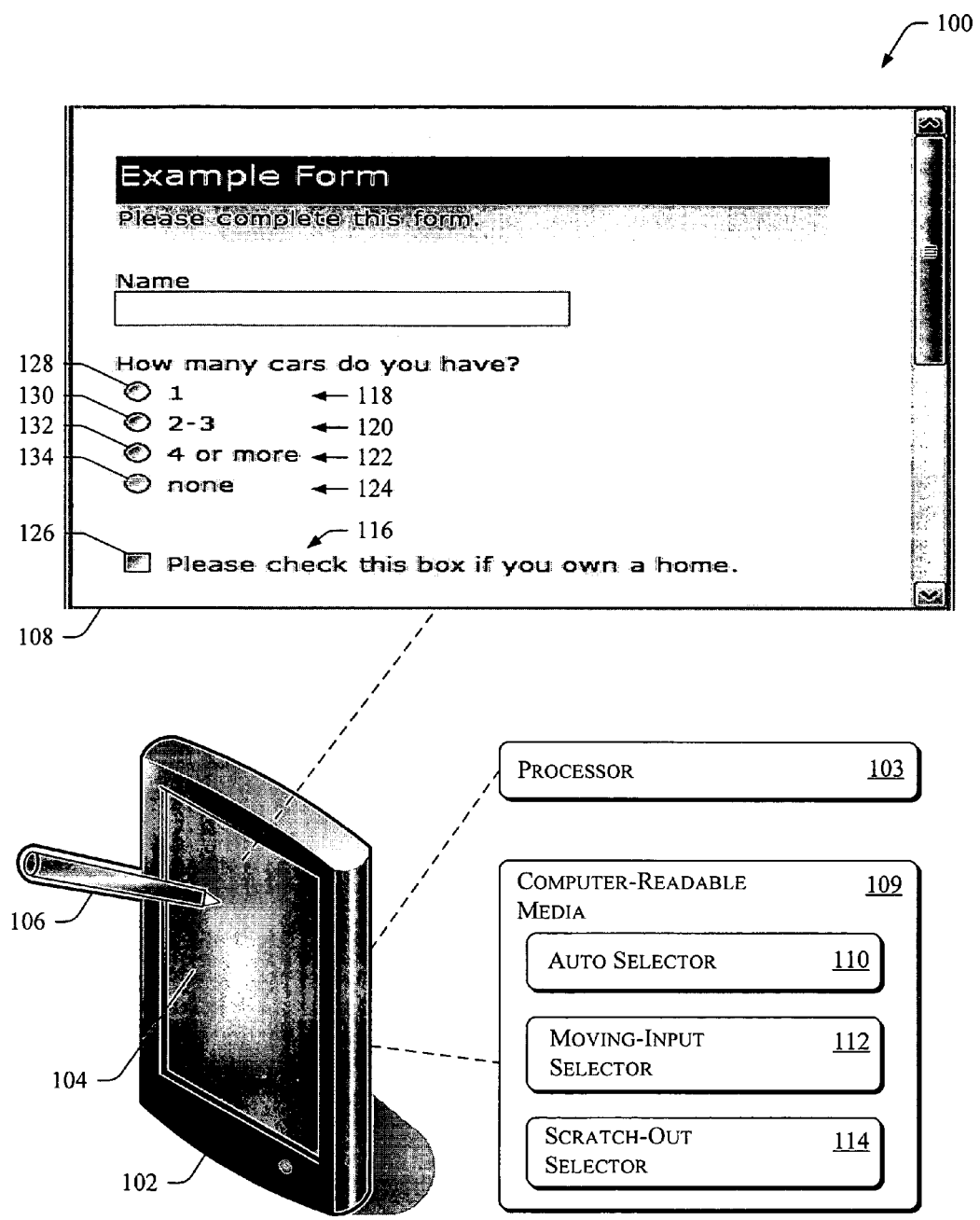
FIG. 1 illustrates an exemplary architecture having a computing device and exemplary applications and a screen shot illustrating an exemplary data-entry form.

Referring to FIG. 1, an exemplary system/architecture 100 is shown having an exemplary computing device 102 with a processor 103, a tablet screen 104, a stylus 106, a data-entry form 108, and computer-readable media comprising: auto selector application 110; moving-input selector application 112; and scratch-out selector application 114. This architecture 100 and its components are shown to aid in discussing the tools but are not intended to limit their scope or applicability.

The computing device comprises hardware and software capable of communicating with or executing the auto selector, the moving-input selector, and/or the scratch-out selector. The computing device is also capable of communicating with a user through the tablet screen. The tablet screen is capable of presenting this and/or other data-entry forms to a user and receiving input from the user. The tablet screen can receive input from a user handwriting over the tablet screen with the stylus, for instance. Other types of screens and input manners may also be used. In another embodiment, a display screen is used that displays handwriting not necessarily written directly over the display screen itself. In this embodiment, the architecture is capable of receiving handwriting from a user through another device (not shown) that is made to, but not over, the display screen, such as handwriting made with a mouse.

Data-entry form 108 comprises multiple data-entry fields and text explaining them. It is, however, just one example of many types of user-input manners that may be used herein. Other types of user-input manners may comprise dialogs, such as those for saving a file, selecting an option, entering information, and the like; word-processing documents; tables; and other manners capable of enabling receipt of input from a user.

The auto selector, moving-input selector, and scratch-out selector applications may operate separately or in combination and comprise computer-readable media executable by a computing device, such as computing device 102. These applications are capable of performing various acts described below.

Enabling a User to Select a Control

Figure 2:
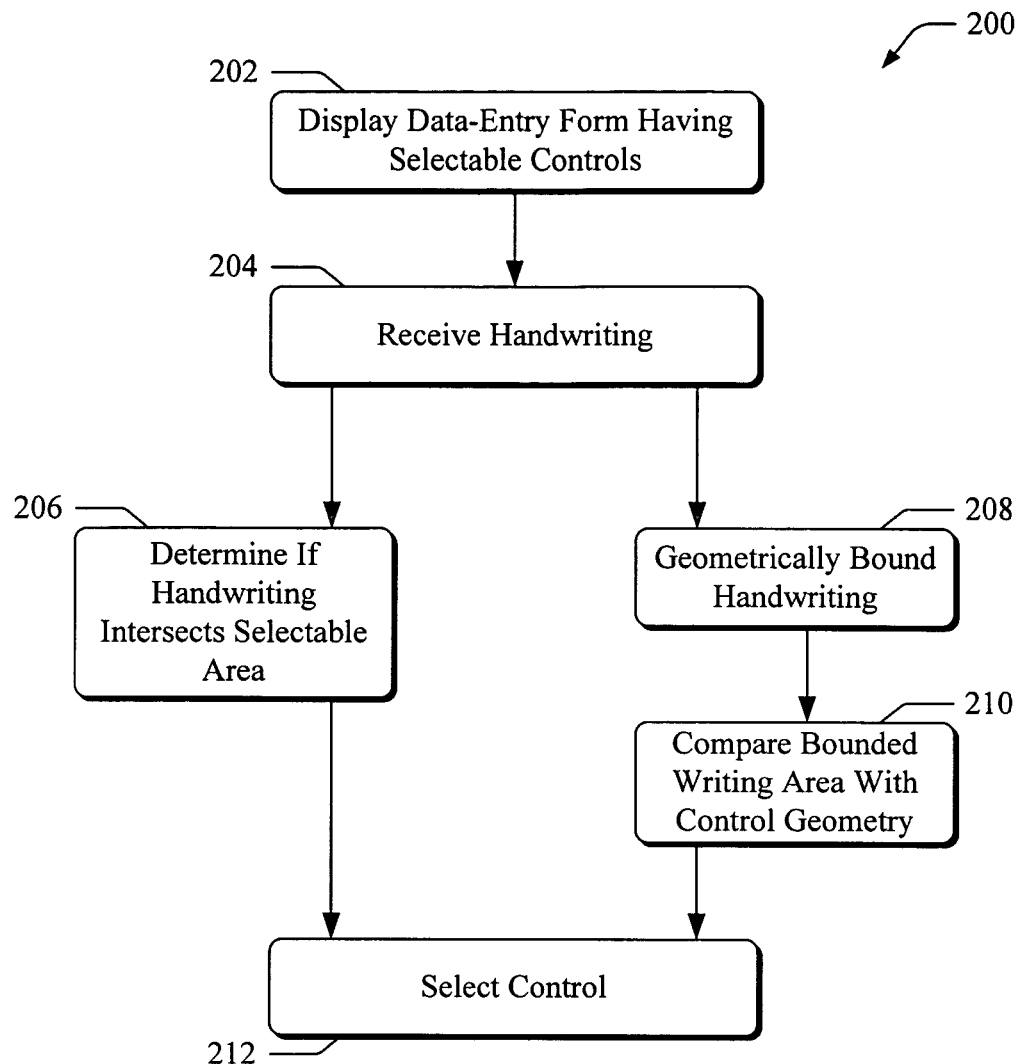
FIG. 2 sets forth a flow diagram of an exemplary process for enabling a user to select a control.

FIG. 2 shows an exemplary process 200 for enabling a user to select a control, such as with handwriting at least part of which resides outside of a selectable area of the control. This process is illustrated as a series of blocks representing individual operations or acts performed by elements of architecture 100, such as auto-selector 110. This and other processes described herein may be implemented in any suitable hardware, software, firmware, or combination thereof. In the case of software and firmware, these processes represent sets of operations implemented as computer-executable instructions.

At block 202, the architecture displays a data-entry form having selectable controls. These selectable controls can comprise radio buttons, check boxes, and the like. Each control may have a selectable area, such as the box of a check box or a button of a radio button, through which a user may select the control by tapping a stylus point within the selectable area. Often, if the selectable area indicates that the control has already been selected, the user's selection acts to deselect the control; both selection and de-selection may represent a user's selection of the control. For radio buttons, for instance, selecting or deselecting one of the buttons may be treated as a selection or de-selection of another of the radio buttons.

A display of exemplary selectable controls is shown in FIG. 1. There, various examples of controls having selectable areas are shown, including a check box control 116 and four radio button controls 118, 120, 122, and 124. The check box control has a selectable box area 126. The radio button controls have selectable button areas 128, 130, 132, and 134.

At block 204, the architecture receives handwriting. This handwriting can comprise one or more handwriting strokes made to a screen by a user. The auto selector can receive the handwriting stroke from various devices or software, such as directly from tablet screen 104.

Figure 3:
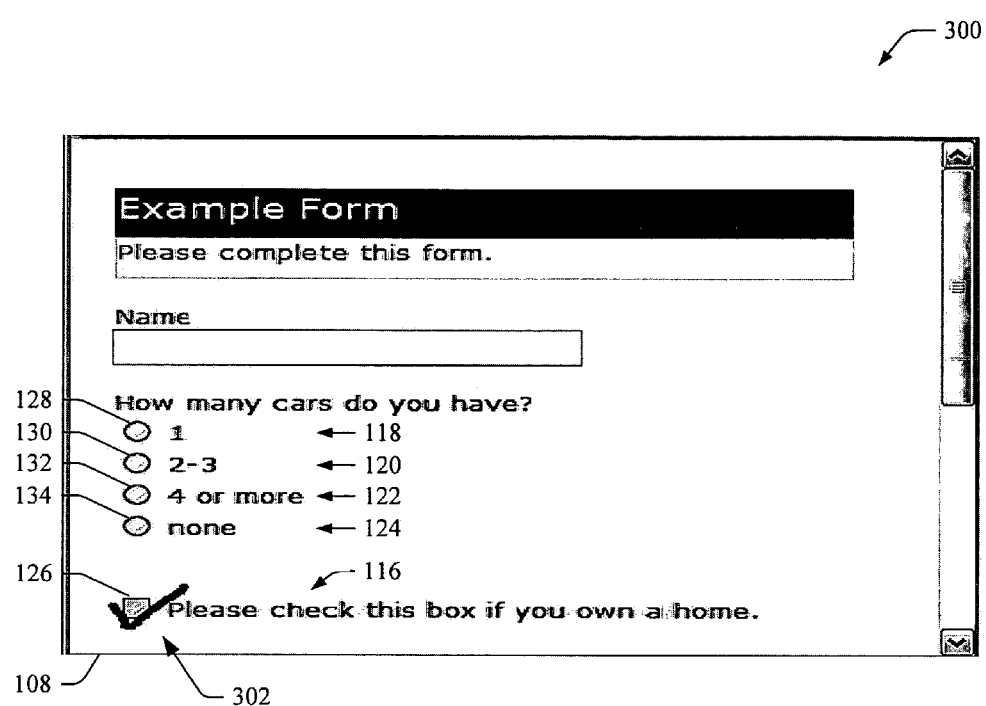
FIG. 3 illustrates the exemplary data-entry form of FIG. 1 and a screen shot, the screen shot showing the data-entry form after handwriting has been received and displayed.

As an example, consider FIG. 3. There, data-entry form 108 and a screen shot 300 showing the data-entry form after handwriting 302 has been received and displayed over the form is shown. Here, the handwriting is a single stylus stroke received from a user through tablet screen 104. In another embodiment, the handwriting is received from a user through another device, such as a mouse that enables handwriting to be made to a screen without necessarily requiring a user to handwrite over that screen.

At block 206, the auto selector may determine if the handwriting is near a selectable area of a control. By so doing, the auto selector can determine that a user may intend to select a control even if the handwriting received does not initiate within a selectable area, cease within the selectable area, and/or intersect the selectable area. Thus, unlike the "tap" stroke described in the Background section above, handwriting may be used to select a control without a user's stylus having to intersect or start, stay, and/or stop in the selectable area.

In some cases the architecture may determine that the handwriting intersects the selectable area of the control and also is of a certain type. If this type comprises one or more handwritten strokes intended to delete information (such as those set forth at block 908 of process 900 below), the auto selector may de-select the control at block 212 (described below).

Continuing the illustrated embodiment, handwriting 302 is determined to intersect selectable box area 126 shown in FIG. 3.

At block 208, alternatively or additionally to block 206, the auto selector geometrically bounds at least a portion of the handwriting received, thereby generating a bounded writing area. The auto selector may, for instance, bound a beginning, middle, and/or end of the handwriting received. In one embodiment, a bounding-type algorithm is used.

Consider, for example, FIG. 4. In this illustrated embodiment, the auto selector computes a bounded writing area 402 for handwriting 302 shown over data-entry form 108. This is shown for explanation, and so may not be shown to a user. In this example, the bounding-type algorithm generates a rectangle—although any suitable shape may be used.

At block 210 (FIG. 2), the auto selector compares the bounded writing area with control geometries for selectable controls. These control geometries can comprise selectable areas of the controls, such as selectable box area 126 of FIGS. 1, 3, and 4. These control geometries can also comprise areas associated is with the control, such as an area occupied by text describing the control.

Continuing the illustrated and described embodiment of FIG. 4, the auto selector compares the bounded writing area occupied by the bounding rectangle against selectable areas of data-entry form 108, such as selectable box area 126 and selectable button areas 128 through 134. In the illustrated example, all of the selectable box area overlaps the bounding rectangle.

At block 212, the auto selector selects the control. In two of the above-described embodiments, the auto selector selects the check box control 116. In one of these embodiments, it does so because the handwriting intersects the selectable box area (see block 206).

In another, it does so by comparing control geometries for selectable controls with a bounded writing area for the handwriting. In this embodiment (see FIG. 4), the auto-selector compares the overlapping areas, picking the field with the largest overlap (here only the selectable box area overlaps with the bounded writing area). If there is no overlap, the auto selector can, for example, select a selectable control (or data-entry field) closest to the bounding rectangle, ignore the handwriting, or inform the user as to how to select controls through a dialog box.

The auto-selector may, however, balance and/or rely on both of these manners of selecting a control.

Figure 5:
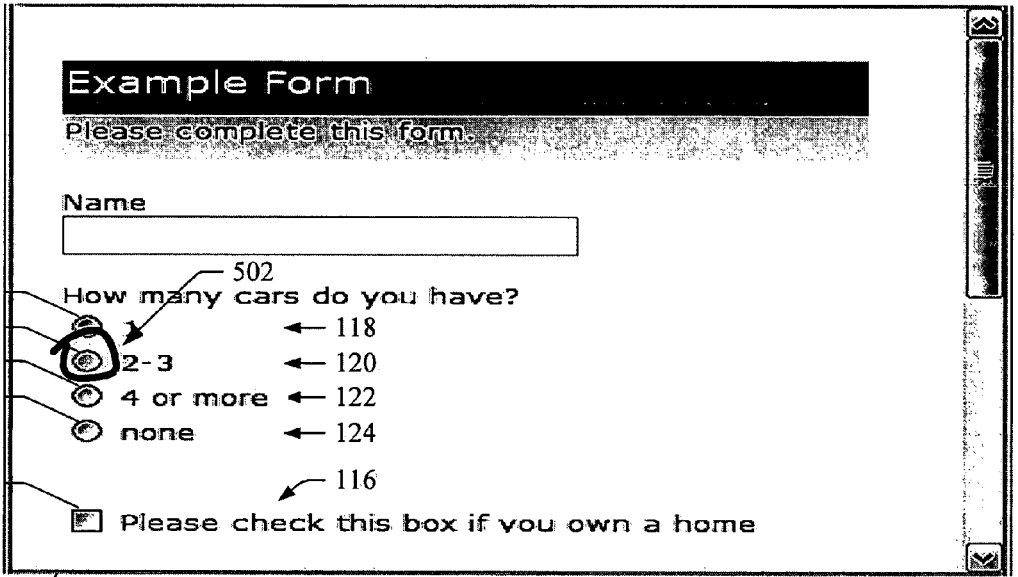
FIG. 5 illustrates the exemplary data-entry form of FIG. 1 and a screen shot showing the data-entry form after handwriting has been received and displayed.

As another example, consider FIG. 5. There, data-entry form 108 and a screen shot 500 showing the data-entry form after handwriting 502 has been received and displayed over the form is shown. Here, the handwriting is a single stylus stroke roughly comprising a circle. Following the above process 200, the auto selector enables a user to select a control and receives the handwriting 502 to that end. The auto selector may then follow block 206 and/or blocks 208 and 210 before proceeding to block 212. In this example, the handwriting intersects selectable button area 128. On this basis alone, the auto-selector may select the corresponding button control 118. The auto-selector may also determine that a bounded writing area of the handwriting overlaps much more of the selectable button area 130 of the button control 120 than that of the area 128. The auto-selector may balance these conflicting manners of selecting a control, in this embodiment by selecting button control 120. As this example shows, the architecture enables a user to select a control without tapping on the control and without the handwriting of the user intersecting that control.

Returning to process 200, the architecture may indicate its selection graphically (not shown), such as by placing an X or check mark in a check box or coloring in a radio button.

Enabling Automatic Use of a Moving-Input Control

Figure 6:
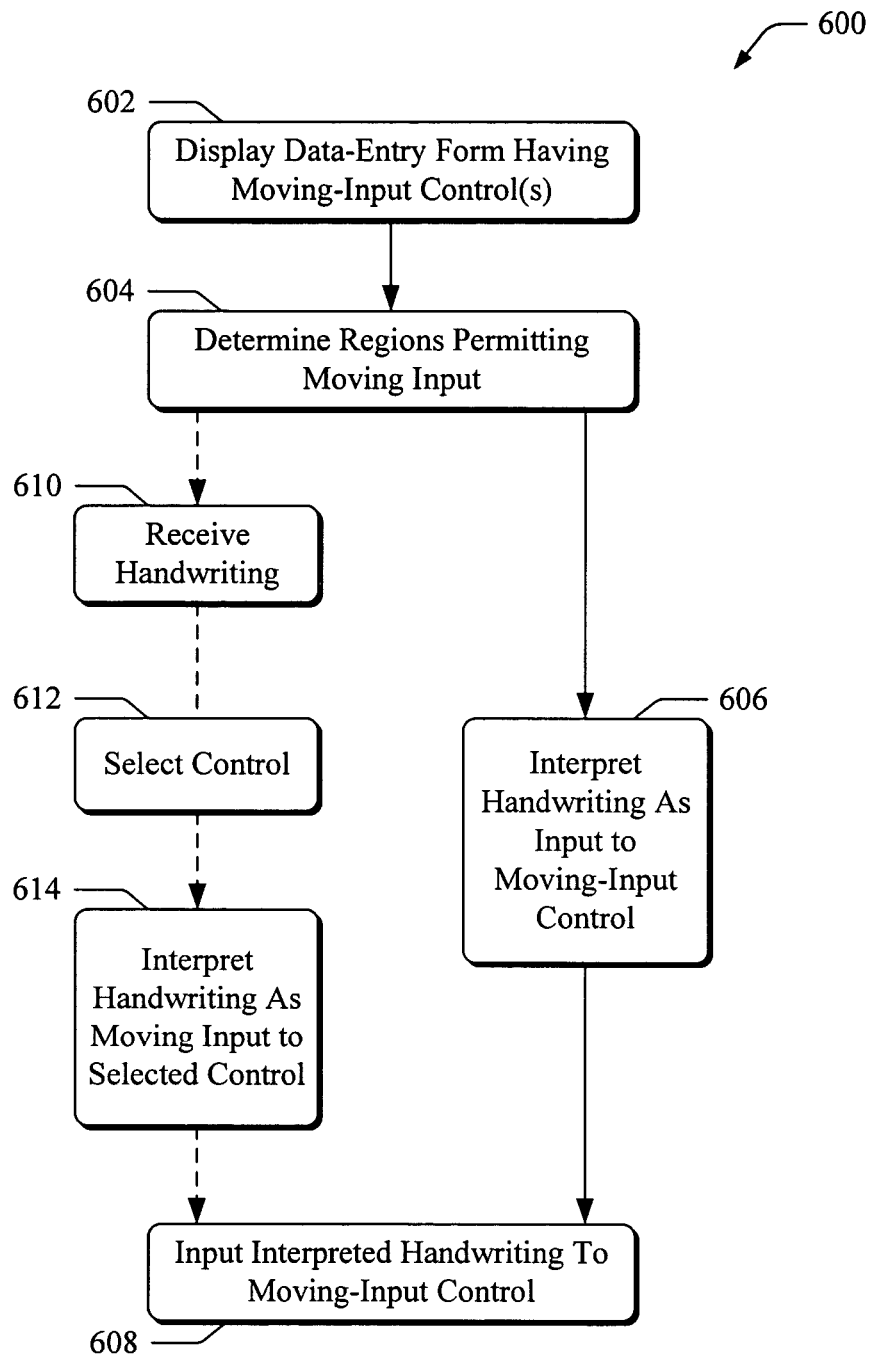
FIG. 6 sets forth a flow diagram of an exemplary process for enabling a user to use a moving-input control.

FIG. 6 shows an exemplary process 600 for enabling a user to use a moving-input control, such as a slider-bar or drawing control, without having to make a selection other than handwriting on, over, or near the control. This process is illustrated as a series of blocks representing individual operations or acts performed by elements of architecture 100, such as moving-input selector 112.

At block 602, architecture 100 displays a data-entry form having moving-input control(s). Each control has a moving-input area through which a user may interact with the control. A drawing control, for instance, may comprise a drawing space for receiving a user's input to make a drawing. A slider-bar control may comprise a scrolling area for receiving a user's input.

Figure 7:
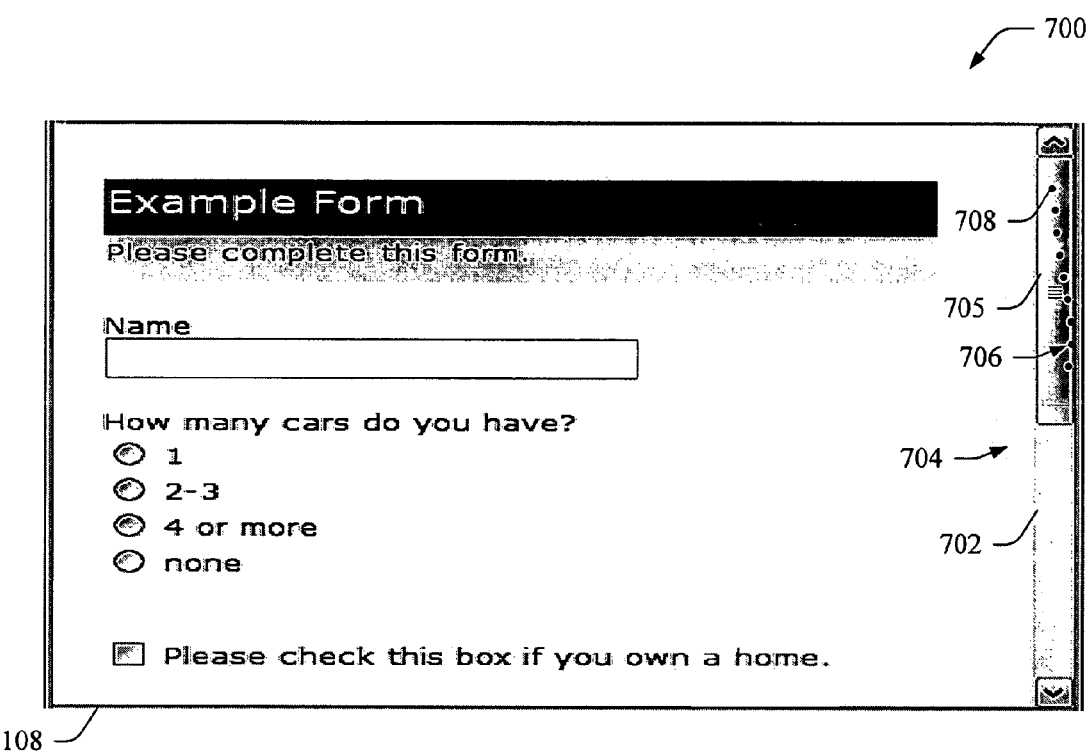
FIG. 7 illustrates the exemplary data-entry form of FIG. 1 and a screen shot showing a path of handwriting made on the data-entry form.

For example, consider FIG. 7. FIG. 7 shows a screen shot 700 of data-entry form 108 having a slider-bar control 702. The slider-bar control comprises a scrolling area 704, in which slider bar 705 may slide, for receiving a user's input to scroll through the form.

At block 604, the architecture (e.g., moving-input selector 112) determines regions of a screen into which a moving input to a control may be made. These regions may map exactly or substantially to moving-input areas that are displayed, such as the scrolling area shown in FIG. 7. The architecture may identify these regions geographically, such as by which pixels occupy the regions, for instance.

Following block 604, two exemplary embodiments of the process 600 are described. The first embodiment is described as part of blocks 606 and 608. The second embodiment is shown with dashed lines in FIG. 6 and described as part of blocks 610, 612, 614, and 608.

At block 606, the architecture interprets handwriting received to a region determined to permit moving input as moving input to a control associated with that region. The architecture may do so based on where handwriting input begins, for instance. Thus, if handwriting begins within the moving-input region, it may be interpreted as input to the moving-input control. Conversely, if handwriting is begun outside of the region but then intercepts the region, it may not be interpreted as input to the moving-input control. In this case, the tools enable a user to have his or her handwriting interpreted as text or moving input without the user having to make another selection other than where the user begins handwriting. As part of or preceding block 606, the handwriting may be received while in a mode permitting handwriting to be interpreted as text.

The architecture enables this region to be used to input text or moving input with handwriting without additional user interaction, such the user selecting to switch away from a mode generally for interpreting handwriting as text or tapping and holding on a control.

The region determined to permit moving input may map exactly or approximately to an area or graphic associated with the moving-input control. In the illustrated example, the region maps to an area occupied by scrolling area 704 of FIG. 7. In this case, a user may handwrite over the scrolling area and have his or her handwriting be interpreted as text or as moving input, based on whether or not the handwriting began in the scrolling area.

Figure 8:
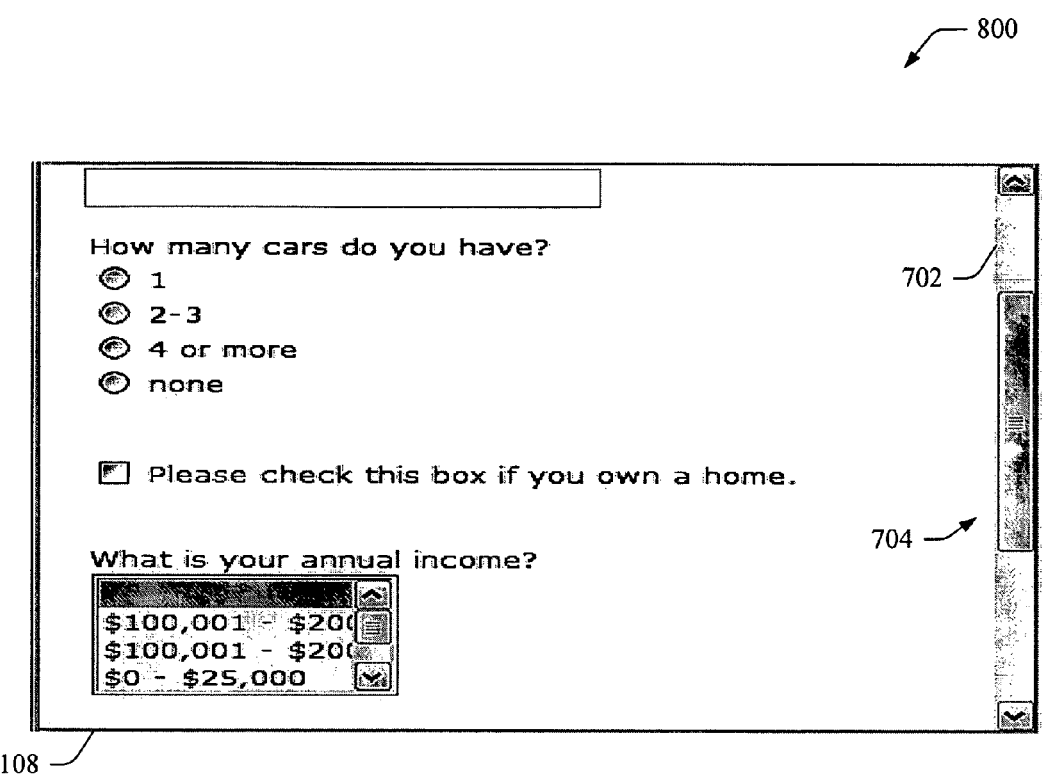
FIG. 8 illustrates the exemplary data-entry form of FIG. 1 and a screen shot showing a scroll down from the screen shot shown in FIG. 7.

At block 608, the architecture inputs the interpreted handwriting to a moving-input control. The effect of this input is shown in FIG. 8, where screen shot 800 shows the form scrolled down from its previous position (the handwriting input by the user to the slider-bar control is not displayed). The architecture can input the interpreted handwriting continuously, enabling in this case the form to be scrolled down contemporaneously with the user's handwriting, or discontinuously.

Additional handwriting to the screen may be interpreted as moving input, text, or otherwise. If the user writes another handwriting stoke on the screen, it may be interpreted in a same or different way. Thus, a user may handwrite for interpretation as text, then handwrite for interpretation as a moving input (such as described above), and then go back to handwriting for interpretation as text, all without having to make additional input other than the handwriting itself.

The second embodiment of process 600 follows blocks 610, 612, 614, and 608. At block 610, the architecture receives handwriting while in a mode permitting the handwriting to be interpreted as text. This handwriting may be communicated between elements of the architecture, such as between tablet screen 104 and the moving-input selector, and may comprise indicia for handwriting strokes recognizable as text or otherwise.

Also, the handwriting and/or its indicia may comprise a first portion of a handwriting stroke that is being received, such as a first pixel of the handwriting stoke. This handwriting can be received while in a text-permitting mode; it does not have to be received in a mode in which handwriting is generally not interpreted as text, such as when a user selects out of a text-permitting mode by tapping and holding on a control. At this block 610, the architecture may receive only a small portion of the handwriting eventually received before proceeding to select, interpret, and/or input the handwriting to a control, as set forth in blocks 612, 614, and 608 described herein.

To illustrate a handwriting stroke all of which has been received, consider handwriting 706 of FIG. 7. This handwriting is shown with a dotted stroke to illustrate handwriting input from a user, though moving-input selector 112 may instead not show the handwriting other than through its effect on a control, such as by having slider bar 705 move and the electronic form scroll. If this handwriting were to be interpreted as text, it could be displayed as a solid-line stroke and might be interpreted as an "I", i.e., text, rather than as moving-input to slider-bar control 702. Moving-input selector 112 may instead interpret the handwriting as input to the slider-bar control. In this case, the handwriting may not be displayed and the handwriting may immediately be used as input to the moving-input control.

At block 612, the moving-input selector selects, responsive to the handwriting received, a moving-input control. This handwriting received may comprise the first portion of the handwriting stroke being received. The moving-input selector can make this selection based on a geographic relation between the handwriting and a region of a screen into which a moving input to a control may be made. This geographic relation can be based on the handwriting intersecting or residing near one of these regions. Alternately or additionally, a small or first-received portion of the handwriting, such as the first pixel, can be analyzed to make the selection. By so doing, the moving-input selector can select the control quickly and enable future-received handwriting, such as a remaining portion a handwriting stroke, to quickly be used as input to the selected control.

The moving-input selector selects the slider-bar control based on a determination that the start point of the handwriting intersects the scrolling area of the slider-bar control, the effect of which is shown with the illustrated example (the illustrated example also shows effects of other embodiments, such as the first embodiment of process 600).

The moving-input selector determines a geographic relation between handwriting 706 and scrolling area 704 of the slider-bar control. In this case, a start point 708 of handwriting 706 (shown in FIG. 7) is compared with the scrolling area and found to intersect it. In other embodiments, however, handwriting may begin outside the moving-input area and then intersect the moving-input area. How quickly the handwriting intersects or a distant between the start point and a first intersection point may be used to determine whether or not the user intends his or her handwriting to be interpreted as input to a control rather than text.

In one embodiment, for instance, handwriting begun within three pixels or one millimeter (whichever is more) that intersects a moving-input area within another six pixels or two millimeters (whichever is more) is interpreted as a moving input to the control having this moving-input area.

In still other embodiments, the moving-input selector may use a bounding-type algorithm to compute a bounded writing area (e.g., a bounding rectangle) of part or all of a handwriting. The moving-input selector can then compare this bounded writing area with regions of the screen into which the handwriting is made to make a selection.

At block 614, the architecture, responsive to the selection of the control, interprets handwriting as input to that control. The architecture can interpret the handwriting received and used to make the selection as input to the control (e.g., the first portion of the handwriting stroke), additional handwriting received after making the selection (e.g., a second portion or remainder of the handwriting stroke), or both. The architecture may do so without reliance on input from a user other than the handwriting itself; in other words, the architecture may interpret handwriting as input to a moving-input control without a user having to first select the control or select that his or her handwriting not be interpreted as text, such as with a tap-and-hold input.

The moving-input selector selected the slider-bar control based on a determination that the start point of the handwriting intersects the scrolling area of the slider-bar control. Responsive to this selection, the architecture interprets handwriting received after the start point that is part of the same handwriting stroke as a command to the control and thus scrolls down through the electronic document.

At block 608, the architecture inputs the interpreted handwriting to the moving-input control, in this case after selecting the moving-input control. The effect of this input is shown in FIG. 8.

The receiving done at block 610, the selecting done at block 612, the interpreting at block 614, and the inputting at this block may be performed quickly and automatically. By so doing, the architecture may receive a first and/or small portion of a user's handwriting and, as handwriting is continuing to be received, select a moving-input control into which to input the handwriting as it is received.

In one embodiment, the actions described in blocks 610, 612, 614, and 608 or 606 and 608 are performed automatically and/or seamlessly; the user simply strokes his or her stylus along a slider bar and sees the slider bar move and the electronic form scroll. Thus, without requiring a user to tap and hold over a moving-input control, the tools may automatically select a control and treat as moving input to that control the user's handwriting.

Enabling a User to Delete Text

Figure 9:
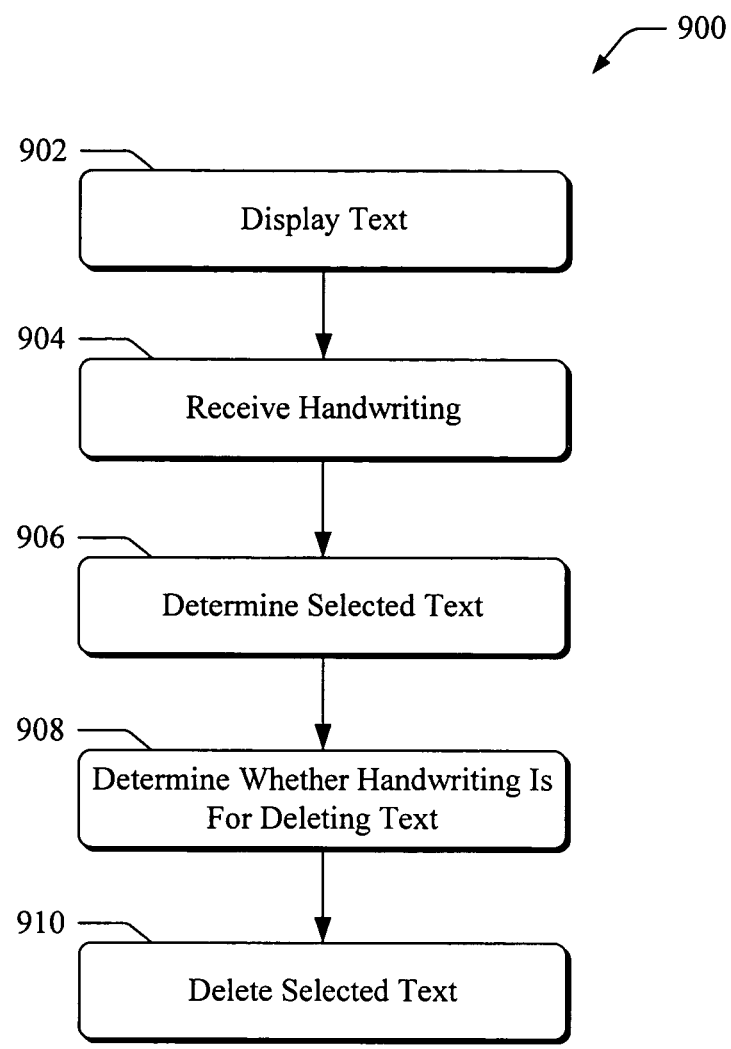
FIG. 9 sets forth a flow diagram of an exemplary process for enabling a user to delete text displayed on a screen by handwriting over that text.

FIG. 9 shows an exemplary process 900 for enabling a user to delete text displayed on a screen. This process is illustrated as a series of blocks representing individual operations or acts performed by elements of architecture 100, such as scratch-out selector 114.

At block 902, architecture 100 displays text, such as letters or numbers, on a screen. For purposes of the process 900, the text may be displayed as part of a structured or unstructured electronic document, such as tables, data-entry forms having data-entry fields, word-processing documents, and/or dialog box fields. This text may have been converted from prior handwriting or otherwise. This text is not, however, handwriting that has not yet been recognized and converted into text.

At block 904, the architecture receives handwriting at least part of which is made over the displayed text. The handwriting may comprise a single handwriting stroke or multiple strokes. Also, in one embodiment, the handwriting is received without the user having to first select a data-entry field in which the text is displayed or otherwise indicate a cursor location in the field. In this embodiment, the user may simply handwrite over text.

Figure 10:
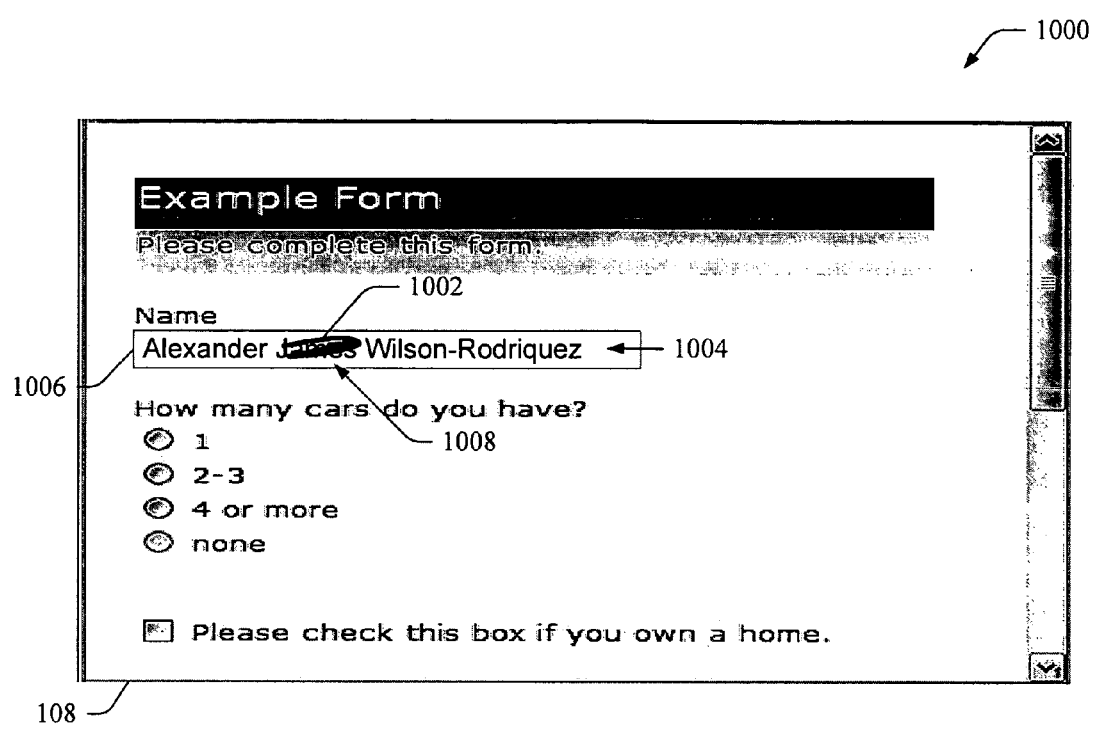

Consider, for example, FIG. 10. In this figure, a screen shot 1000 of electronic data-entry form 108 is presented having handwriting 1002 over text 1004 in a data-entry field 1006.

At block 906, the scratch-out selector, responsive to handwriting being made over the displayed text, selects at least part of the text. This selected text can comprise multiple characters, a single or multiple words, a single or multiple sentences, and the like. In the illustrated embodiment, the selected text is a single word 1008 ("James"). The scratch-out selector may determine what part of the text is selected without interaction with the user other than the handwriting received. Thus, the user need only handwrite over the text that he or she wishes to delete; the user does not need to select the text before handwriting over it.

At block 908, the scratch-out selector determines whether or not the handwriting received is for deleting information, such as the selected text. The scratch-out selector may determine if the handwriting is for deleting text without interaction with the user other than the handwriting received; the user does not need to perform another action besides the handwriting, such as selecting to delete the text before or after handwriting over it.

The scratch-out selector can analyze the handwriting to determine if it is of a type that a user might make in deleting or obscuring something on a paper page. A person writing on paper might, for instance, make a back-and-forth motion with an eraser to delete a word or mark from the page. Similarly, a person might attempt to obscure a word or mark on a page by scribbling over it or scratching it out.

In the illustrated embodiment, the scratch-out selector treats handwriting that represents a continuous back-and-forth motion as handwriting for deleting text. In the case of handwriting generated over a tablet screen with a stylus, this continuity represents a single back-and-forth stroke made without the stylus being lifted or resting for a significant period.

In another embodiment, the scratch-out selector bases its determination on whether the computer-displayed representation of the handwriting obscures a significant portion of the selected text, such as about a twenty percent or more. This handwriting may comprise multiple handwriting stokes, such as when a user lifts a stylus and then continues handwriting to further obscure the text.

In still another embodiment, the scratch-out selector determines that the handwriting is for deleting text if it comprises two or more roughly parallel lines residing substantially over the selected text. These roughly parallel lines may be made with two handwriting strokes, for instance, such as by the user writing one line and then another over text.

In an embodiment mentioned previously as part of the process 200, the scratch-out selector determines that handwriting received is intended to delete or de-select information other than text. A check box or radio button, for instance, that has information indicating that it is selected (such as an X in a check box or a filled-in button on a radio button) may be de-selected based on this determination.

At block 910, the architecture, responsive to determining that the handwriting is for deleting text, deletes the selected text. Continuing the illustrated embodiment, the word 1008 is then deleted from the data-entry field (not shown).

Conclusion

The above-described tools enable a user's interaction with a computing device through handwriting to be more intuitive and/or effective. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computing device having a screen and computer-readable storage media having instructions stored thereon that, if executed by the computing device, cause the computing device to perform a method comprising:
    presenting one or more controls on the screen, at least one of the controls being a moving-input control;
    receiving a handwriting stroke made to the screen;
    generating a bounded rectangle around at least a first portion of the handwriting stroke made to the screen;
    comparing an area within the bounded rectangle to an area associated with the moving-input control to determine if the area within the bounded rectangle overlaps the area associated with the moving-input control;
    selecting, without user interaction independent of the handwriting stroke received and while in a mode permitting the handwriting stroke to be interpreted as text, the moving-input control when the area within the bounded rectangle overlaps the area associated with the moving-input control; and
    interpreting the handwriting stroke as input to the selected moving-input control.

2. The device of claim 1, wherein the interpreting further comprises interpreting a second portion of the handwriting stroke as input.

3. The device of claim 1, wherein at least one of the controls is a drawing control.

4. The device of claim 1 embodied as a hand-held computer.

5. The device of claim 1, wherein the screen comprises a tablet screen capable of receiving handwriting made over the tablet screen.

6. The device of claim 1, wherein the bounded rectangle is generated by geometrically bounding the first portion of the handwriting stroke.

7. The device of claim 1, wherein the bounded rectangle is generated using a bounding-type algorithm.

8. The device of claim 1, wherein the area associated with the moving-input control comprises a selectable area of the moving-input control.

9. The device of claim 1, wherein the area associated with the moving-input control comprises a control geometry of the moving-input control.

10. The device of claim 1, further comprising, responsive to interpreting the handwriting stroke as input to the selected moving-input control, causing movement of the screen based on the input.

11. The device of claim 1, wherein the moving-input control comprises a slider-bar control.

12. A computer-implemented method comprising:
    presenting one or more controls on a screen of a computing device, at least one of the controls being a moving-input control;
    receiving a handwriting stroke made to the screen;
    generating a bounded rectangle around at least a first portion of the handwriting stroke made to the screen;
    comparing an area within the bounded rectangle to an area associated with the moving-input control to determine if the area within the bounded rectangle overlaps the area associated with the moving-input control;
    selecting, without user interaction independent of the handwriting stroke received and while in a mode permitting the handwriting stroke to be interpreted as text, the moving-input control when the area within the bounded rectangle overlaps the area associated with the moving-input control; and
    interpreting the handwriting stroke as input to the selected moving-input control.

13. The computer-implemented method of claim 12, wherein the interpreting further comprises interpreting a second portion of the handwriting stroke as input.

14. The computer-implemented method of claim 12, wherein at least one of the controls is a drawing control.

15. The computer-implemented method of claim 12, wherein the bounded rectangle is generated by geometrically bounding the first portion of the handwriting stroke.

16. The computer-implemented method of claim 12, wherein the bounded rectangle is generated using a bounding-type algorithm.

17. The computer-implemented method of claim 12, wherein the area associated with the moving-input control comprises a selectable area of the moving-input control.

18. The computer-implemented method of claim 12, further comprising, responsive to interpreting the handwriting stroke as input to the selected moving-input control, causing movement of the screen based on the input.

19. The computer-implemented method of claim 12, wherein the moving-input control comprises a slider-bar control.

20. A computer-readable storage device having instructions stored thereon that, if executed, perform a method comprising:

presenting one or more controls on a screen of a computing device, at least one of the controls being a moving-input control;

receiving a handwriting stroke made to the screen;

generating a bounded rectangle around at least a first portion of the handwriting stroke made to the screen;

comparing an area within the bounded rectangle to an area associated with the moving-input control to determine if the area within the bounded rectangle overlaps the area associated with the moving-input control;

selecting, without user interaction independent of the handwriting stroke received and while in a mode permitting the handwriting stroke to be interpreted as text, the moving-input control when the area within the bounded rectangle overlaps the area associated with the moving-input control; and interpreting the handwriting stroke as input to the selected moving-input control.

\* \* \* \* \*